United States Patent
Endo

(10) Patent No.: US 11,361,737 B2
(45) Date of Patent: Jun. 14, 2022

(54) BRIDGE CIRCUIT

(71) Applicant: ROHM CO., LTD., Kyoto (JP)

(72) Inventor: Hiroharu Endo, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 16/936,592

(22) Filed: Jul. 23, 2020

(65) Prior Publication Data
US 2020/0357365 A1 Nov. 12, 2020

Related U.S. Application Data

(63) Continuation of application No. PCT/JP2019/001773, filed on Jan. 22, 2019.

(30) Foreign Application Priority Data

Jan. 26, 2018 (JP) .............................. JP2018-011770

(51) Int. Cl.
*G09G 5/377* (2006.01)
*G09G 5/38* (2006.01)
*G09G 5/393* (2006.01)
*G09G 5/395* (2006.01)

(52) U.S. Cl.
CPC .............. *G09G 5/377* (2013.01); *G09G 5/38* (2013.01); *G09G 5/393* (2013.01); *G09G 5/395* (2013.01); *G09G 2330/12* (2013.01); *G09G 2340/02* (2013.01); *G09G 2340/125* (2013.01); *G09G 2370/00* (2013.01)

(58) Field of Classification Search
CPC .......... G09G 5/377; G09G 5/38; G09G 5/393; G09G 5/395; G09G 2330/12; G09G 2340/02; G09G 2340/125; G09G 2370/00
See application file for complete search history.

(56) References Cited

U.S. PATENT DOCUMENTS

| 8,189,033 B2* | 5/2012 | Ikeda | ................... H04N 13/189 348/42 |
| 2009/0051815 A1* | 2/2009 | Ishikawa | .......... H04N 21/42646 348/589 |
| 2015/0193062 A1 | 7/2015 | Wyatt | |

FOREIGN PATENT DOCUMENTS

| JP | H06317782 A | 11/1994 |
| JP | 2002169524 A | 6/2002 |
| JP | 2013195776 A | 9/2013 |

(Continued)

OTHER PUBLICATIONS

JPO Notice of Reasons for Refusal for corresponding JP Application No. 2019-567073; dated Apr. 6, 2021.

(Continued)

*Primary Examiner* — Antonio A Caschera
(74) *Attorney, Agent, or Firm* — Cantor Colburn LLP

(57) ABSTRACT

In a normal state, a video input interface receives video data. In a setup state, a control input interface receives graphics data for an On Screen Display (OSD) function. In the setup state, an encoder encodes the graphics data, and stores compressed image data $S_6$ thus encoded in memory. In the normal state, a decoder reads one item of the compressed image data from the memory according to an instruction signal, and decodes the compressed image data thus read so as to reproduce the original graphics data. A multiplexer superimposes graphics data on frame data, and outputs the superimposed graphics data.

10 Claims, 14 Drawing Sheets

(56) References Cited

FOREIGN PATENT DOCUMENTS

| JP | 2014186196 A | 10/2014 |
| JP | 2016116126 A | 6/2016 |
| WO | 2018003669 A1 | 1/2018 |

OTHER PUBLICATIONS

International Search Report for International Application No. PCT/JP2019/001773; dated Mar. 5, 2019.
PCT International Preliminary Report on Patentability and Written Opinion of the International Searching Authority International Application No. PCT/JP2019/001773; dated Aug. 6, 2020.

* cited by examiner

FIG. 6

| RUN-LENGTH VALUE RL (pixels) | DATA COMPRESSION RATE (AFTER COMPRESSION / BEFORE COMPRESSION) | NUMBER OF RUN-LENGTH WORDS |
|---|---|---|
| 1 | 1.25 | 0 |
| ~ 17 | 1.25 ~ 0.15 | 1 |
| ~ 257 | 0.2 ~ 0.015 | 2 |
| ~ 4097 | 0.02 ~ 0.0012 | 3 |

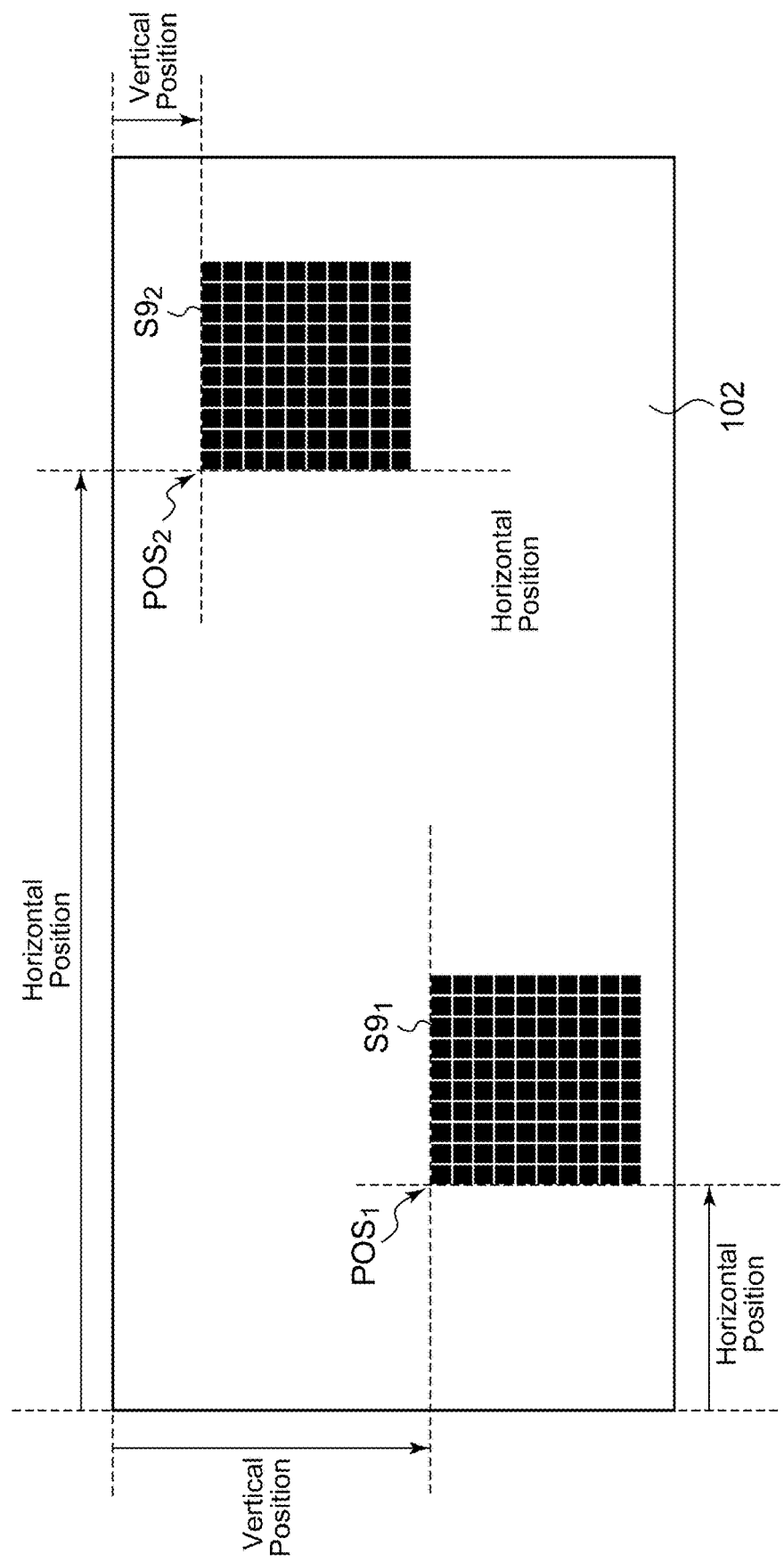

BRIDGE CIRCUIT

CROSS REFERENCE TO PRIOR APPLICATIONS

This application is a continuation under 35 U.S.C. § 120 of PCT/JP2019/001773, filed Jan. 22, 2019, which is incorporated herein reference and which claimed priority to Japanese Application No. 2018-011770, filed Jan. 26, 2018. The present application likewise claims priority under 35 U.S.C. § 119 to Japanese Application No. 2018-011770, filed Jan. 26, 2018, the entire content of which is also incorporated herein by reference.

BACKGROUND

1. Technical Field

The present disclosure relates to a bridge circuit.

2. Description of the Related Art

FIG. 1 is a block diagram showing an image display system. An image display system 100R includes a display panel 102 configured as a liquid crystal panel, organic EL panel or the like, a gate driver 104, a source driver 106, a graphics controller 110, and a timing controller 200R. The graphics controller 110 generates image data to be displayed on the display panel 102. The image data includes pixel (RGB) data, which is to be transmitted in a serial format to the timing controller 200R.

The timing controller 200R receives the image data, and generates various kinds of control/synchronization signals. The gate driver 104 sequentially selects scanning lines Ls of the display panel 102 in synchronization with a signal received from the timing controller 200R. Furthermore, the RGB data is supplied to the source driver 106.

The timing controller 200R includes a reception circuit 202, a transmission circuit 204, and a logic circuit 210. The reception circuit 202 receives the image data transmitted in a serial format from the graphics controller 110. ROM 111 configured as an external component stores identification (ID) information, resolution information, refresh rate information, etc., with respect to the display panel 102. The logic circuit 210 generates a control/synchronization signal based on the image data received by the reception circuit 202. The transmission circuit 204 outputs the control signal and the image data to the gate driver 104 and the source driver 106.

In some cases, in addition to a function of displaying the image data received by the reception circuit 202, the timing controller 200R is required to have an On Screen Display (OSD) function for displaying predetermined characters, figures, and icons (which will also be referred to simply as "graphics" hereafter). In order to meet such a request, the logic circuit 210 includes an OSD circuit 212.

The ROM 111 stores bitmap data of several characters or icons. The timing controller 200R reads, from the ROM 111, bitmap graphics data that corresponds to a control signal input in addition to the image data. The timing controller 200R displays the bitmap graphics data on the display panel 102.

Problem 1

With the timing controller 200R according to a conventional technique, such bitmap graphics data is required to be stored in the ROM 111. However, the capacity of the ROM 111 is limited. Accordingly, such an arrangement has a problem in that it is difficult to support a large number of pixels for graphics. Furthermore, the timing controller 200R can display only graphics data stored in the ROM 111. Accordingly, after it is shipped as a product, it is difficult to change and add graphics. As described above, such a timing controller according to a conventional technique has a problem of an OSD function with poor flexibility.

Problem 2

Typically, the timing controller 200R and the graphics controller 110 are coupled via a differential serial interface. During a period from the start-up operation of the image display system 110R up to the link establishment supported by the serial interface between the timing controller 200R and the graphics controller 110, such an arrangement is not able to transmit image data. Accordingly, in this period, no image can be displayed on the display panel 102. Also, if link disconnection occurs due to noise effects or the like after the link has been established, such an arrangement is not able to display any image on the display panel 102 before the link is established again. Also, the same problem occurs when a cable is detached or disconnected, or when a malfunction occurs in a part of the serial interface or the graphics controller 110. Such a state in which an image cannot be displayed will be referred to as a "non-displayable state".

In recent years, development has been advanced for liquid crystal panels for in-vehicle use. That is to say, multiple kinds of meters or warning lamps have been replaced by a liquid crystal panel (which will be referred to as a cluster panel). If a malfunction occurs in the communication between the in-vehicle cluster panel and the graphics controller, which leads to a non-displayable state, the in-vehicle cluster panel is not able to notify the driver of necessary information. It is undesirable for such a non-displayable state to be left as it is. In addition to such in-vehicle applications, the same can be said of various kinds of applications such as medical applications etc., that require high reliability.

SUMMARY

Embodiments of the present disclosure has been made in order to solve the problem 1 and/or the problem 2.

An embodiment of the present disclosure relates to a bridge circuit. The bridge circuit is structured to receive input video data from a given image processing semiconductor device, and to relay the input video data thus received to a different image processing semiconductor device. The bridge circuit includes: a video input interface structured to receive input video data in a normal state; a control input interface structured to, in a setup state, receive multiple items of compressed graphics data for an On Screen Display (OSD); an encoder structured to, in the setup state, encode the multiple items of graphics data, and store the multiple items of compressed image data thus encoded in memory; a decoder structured to, in the normal state, read from the memory one item that corresponds to an instruction signal from among the multiple items of compressed image data, and decode the compressed image data thus read, so as to reproduce original graphics data; and a multiplexer structured to superimpose the graphics data on the input video data.

Another embodiment of the present disclosure also relates to a bridge circuit. The bridge circuit includes: a video input interface structured to receive input video data; memory structured to hold reference graphics data that describes predetermined graphics that can be included in the input video data; an image processing circuit structured to generate output video data to be displayed on a display panel based on the input video data; and an abnormal state detector structured to judge the presence or absence of an abnormal state based on the input video data and the reference graphics data.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 6 is a diagram showing the data compression rate for the same-color segment in a case in which the second data structure shown in FIG. 5B is employed;

FIG. 7 is a diagram showing a display panel on which two items of graphics data are displayed;

DETAILED DESCRIPTION

Overview of the Embodiments

Figure 1:
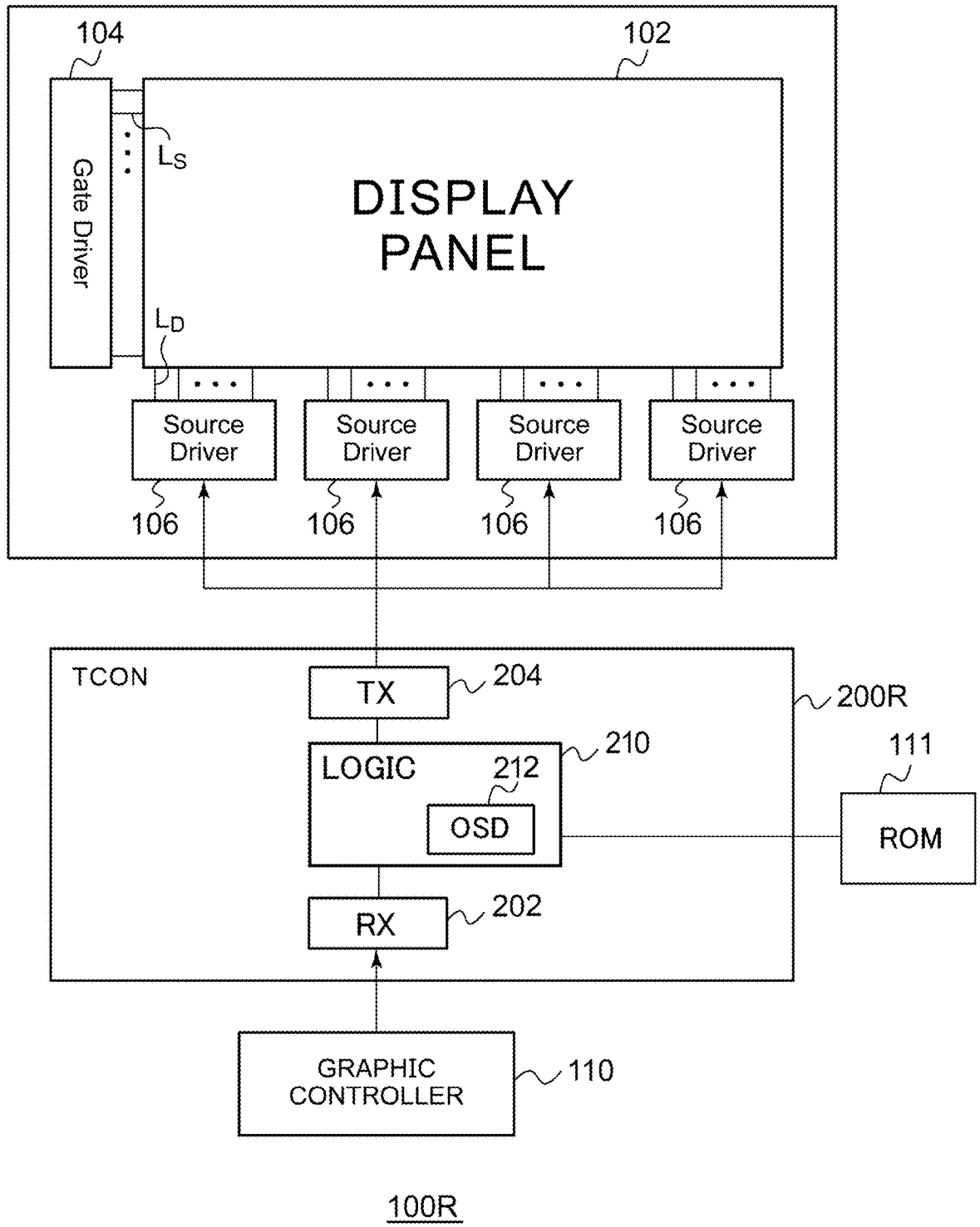
FIG. 1 is a block diagram showing an image display system.

1. An embodiment disclosed in the present specification relates to a bridge circuit. The bridge circuit is arranged on a transmission path of video data from a graphics controller to a timing controller.

The bridge circuit includes: a video input interface structured to receive input video data in a normal state; a control input interface structured to, in a setup state, receive multiple items of compressed graphics data for an On Screen Display (OSD); an encoder structured to, in the setup state, encode the multiple items of graphics data, and store the multiple items of compressed image data thus encoded in memory; a decoder structured to, in the normal state, read from the memory one item that corresponds to an instruction signal from among the multiple items of compressed image data, and decode the compressed image data thus read, so as to reproduce original graphics data; and a multiplexer structured to superimpose the graphics data on the input video data.

A bridge circuit including an encoder and a decoder for supporting the OSD graphics data as its built-in components is provided as an additional component to an image display system including a graphics processor or a timing controller. With such an arrangement, graphics data is supplied to the bridge chip for every setup operation. This allows various kinds of graphics data to be displayed. It should be noted that examples of such graphics data include figures, icons, characters, and desired combinations thereof.

Also, the encoder may compress the graphics data using a run-length compression method. Also, the compressed image data may include at least one item of segment data. Also, each segment data may represent a same-color segment including consecutive pixels having the same color. This allows the circuit scale of the encoder to be reduced. Furthermore, this allows the memory capacity to be reduced.

Also, the segment data may include color data that represents color and a run-length value that represents the number of consecutive pixels. Also, the run-length value may be configured to have a variable format length. This provides a further improved data compression rate.

Also, the segment data may include: a color word and at least one run-length word. Also, the color word may include a separator bit and the color data. Also, each run-length word may include a separator bit and a run-length value.

Also, the segment data may include: a color word including the color data; a word-number indication bit that indicates the number of words that represent the run-length value; and run-length words, the number of which matches the number of words represented by the word-number indication bit.

Also, the control input interface may receive size data that indicates the pixel size of the graphics data. Also, the control input interface may store the compressed image data in the memory together with the size data thus received. This allows graphics data having various sizes to be displayed.

Also, the instruction signal may include position information that indicates the position at which the graphics data is to be displayed. Also, the multiplexer may display the graphics data at a position that corresponds to the position information. This provides a more flexible OSD function.

Also, the control input interface may be structured as a Serial Peripheral Interface (SPI) or an Inter-Integrated Circuit (I²C) interface. Such interfaces are widely employed for general purposes, thereby allowing the control input interface to be easily supported.

2. Another embodiment disclosed in the present specification also relates to a bridge circuit. The bridge circuit includes: a video input interface structured to receive input video data; memory structured to hold reference graphics data that describes predetermined graphics that can be included in the input video data; an image processing circuit structured to generate output video data to be displayed on a display panel based on the input video data; and an abnormal state detector structured to judge the presence or absence of an abnormal state based on the input video data and the reference graphics data.

By providing the bridge circuit as an additional component to the image display system, this arrangement is capable of judging whether or not the input video data is transmitted normally from the graphics processor, thereby allowing the occurrence of an abnormal state to be detected. It should be noted that examples of such graphics data include figures, icons, characters, and desired combinations thereof.

Also, the bridge circuit may further include a control input interface provided as an additional component that differs from the video input interface, which allows the bridge circuit to communicate with an external processor.

Also, the predetermined graphics may be displayed at a variable position. Also, a control signal received by the control input interface from the processor may include position information that designates the display position of the predetermined graphics.

Also, the predetermined graphics may be fixedly arranged at a predetermined position in a state in which the predetermined graphics cannot be noticed by the user. Also, the abnormal state detector may provide the judgment processing for each frame. The predetermined graphics may be fixedly arranged at a predetermined position at an edge portion on the display panel such that it cannot be seen by the user.

Also, the control signal received by the control input interface from the processor may include information that indicates whether or not the predetermined graphics are to be used as a judgment target by the abnormal state detector. Also, the control signal may include information that indicates whether or not a current frame is to be used as a judgment target by the abnormal state detector.

Also, the bridge circuit may be structured to have an OSD function. Also, the memory may store graphics data for the OSD. In the OSD mode, the image processing circuit may superimpose the graphics data for the OSD on the input video data.

Also, the reference graphics data may be structured as shared graphics data to also be used as the graphics data for the OSD. This allows the memory capacity to be saved.

Also, the timing controller may be structured to be capable of selecting the OSD mode and a judgment mode in which the abnormal state detector provides judgement.

Also, the memory may be structured as nonvolatile memory.

Also, the memory may be structured as volatile memory. In the setup state, the control input interface may be structured to be capable of receiving graphics data that represents the predetermined graphics. Also, the bridge circuit may further include: an encoder structured to, in the setup state, encode the graphics data so as to generate compressed image data, and store the compressed image data thus encoded in the memory as the reference graphics data; and a decoder structured to, in a normal state, decode the reference graphics data so as to reproduce original graphics data. This allows various kinds of graphics data to be displayed.

Also, the encoder may compress the reference graphics data using a run-length compression method. Also, the compressed image data may include at least one item of segment data. Also, each segment data may represent a same-color segment including consecutive pixels having the same color. This allows the circuit scale of the encoder to be reduced. Furthermore, this allows the memory capacity to be reduced.

Also, the control input interface may be structured as a Serial Peripheral Interface (SPI) or an Inter-Integrated Circuit ($I^2C$) interface. Such interfaces are widely employed for general purposes, thereby allowing the control input interface to be easily supported.

Also, the bridge circuit may be structured to issue an interrupt to the processor when the abnormal state detector detects an abnormal state. This allows the processor to be notified of the occurrence of a non-displayable state. Before the occurrence of the non-displayable state, the processor may instruct the bridge circuit to operate in the judgment mode. Upon receiving an interrupt, the processor may instruct the bridge circuit to operate in the OSD mode. In the OSD mode, the control input interface may be used to compensate for the loss of the input video data.

EMBODIMENTS

Description will be made below regarding the present disclosure based on preferred embodiments with reference to the drawings. The same or similar components, members, and processes are denoted by the same reference numerals, and redundant description thereof will be omitted as appropriate. The embodiments have been described for exemplary purposes only, and are by no means intended to restrict the present disclosure. Also, it is not necessarily essential for the present disclosure that all the features or a combination thereof be provided as described in the embodiments.

In the present specification, a state represented by the phrase "the member A is coupled to the member B" includes a state in which the member A is indirectly coupled to the member B via another member that does not substantially affect the electric connection between them, or that does not damage the functions of the connection between them, in addition to a state in which they are physically and directly coupled.

Similarly, a state represented by the phrase "the member C is provided between the member A and the member B" includes a state in which the member A is indirectly coupled to the member C, or the member B is indirectly coupled to the member C via another member that does not substantially affect the electric connection between them, or that does not damage the functions of the connection between them, in addition to a state in which they are directly coupled.

First Embodiment

Figure 2:
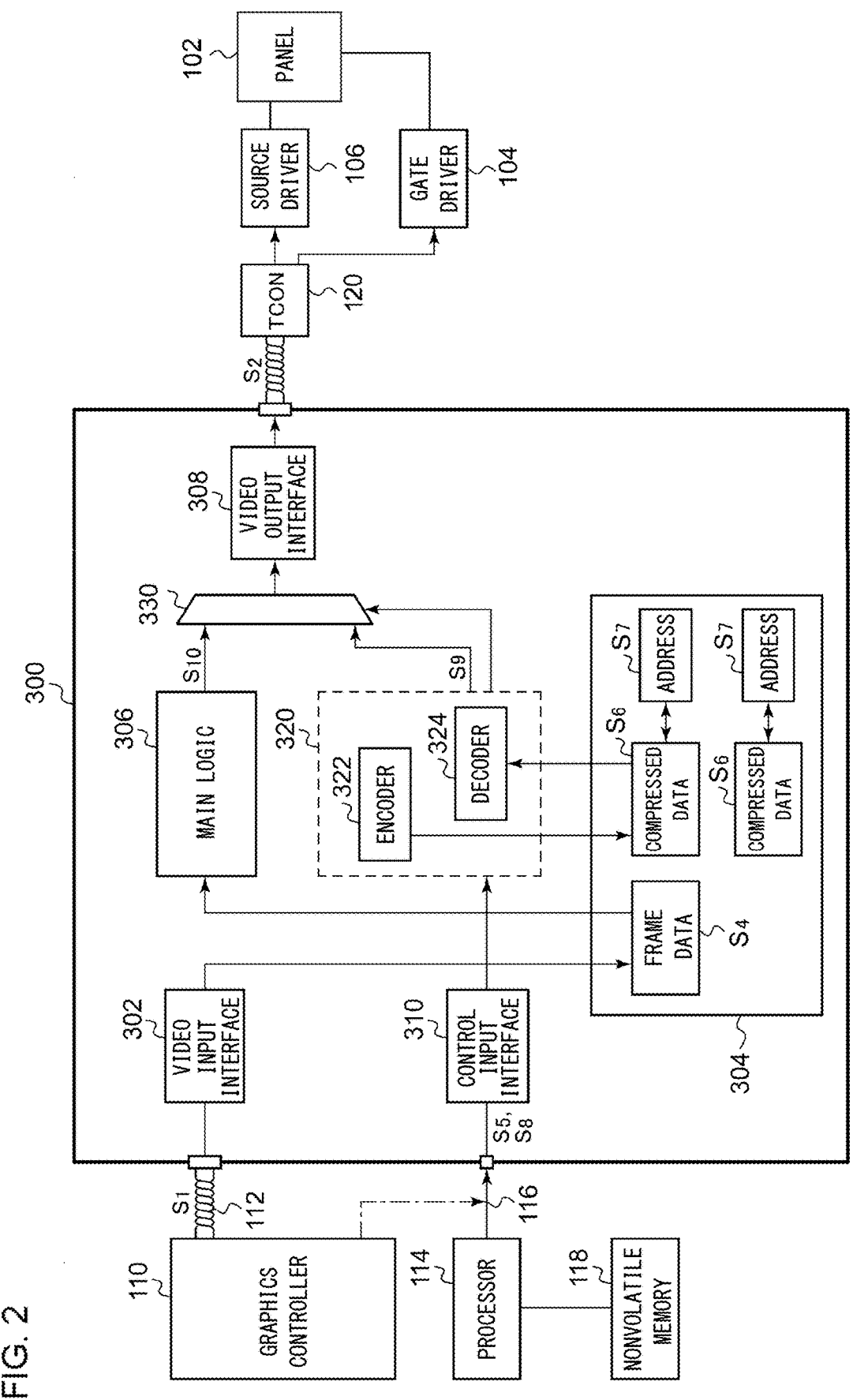
FIG. 2 is a block diagram showing an image display system including a bridge circuit according to an embodiment.

FIG. 2 is a block diagram showing an image display system 100 including a semiconductor apparatus 300 according to a first embodiment.

The image display system 100 includes a display panel 102, a gate driver 104, a source driver 106, a graphics controller 110, a processor 114, and a timing controller 120, in addition to the bridge circuit 300.

The graphics controller 110 is configured as a Graphics Processing Unit (GPU) or the like, and generates video data $S_1$. The graphics controller 110 includes a transmitter (video output interface) that conforms to the HDMI (trademark) standard, Display Port standard, or digital visual interface (DVI) standard. The graphics controller 110 is coupled to the bridge circuit 300 via a video transmission line 112. A digital video signal including the video data $S_1$ is transmitted in a serial format to the bridge circuit 300. The bridge circuit 300 receives the input video data $S_1$ from the graphics controller 110, and relays the input video data $S_1$ thus received to the timing controller 120.

The microcontroller (processor) 114 integrally controls the image display system 100. The processor 114 and the bridge circuit 300 are coupled via a control line 116 that differs from the video transmission line 112. The control line 116 may be configured using an I²C interface or SPI.

The timing controller 120 receives the output video data $S_2$ from the bridge circuit 300, and controls one or multiple source drivers 106 and the gate driver 104.

The bridge circuit 300 includes a video input interface 302, memory 304, a main logic 306, a video output interface 308, a control input interface 310, and an OSD processing unit 320.

The video input interface 302, the main logic 306, and the video output interface 308 function as a circuit block for supporting relaying of the video data from the graphics controller 110 to the timing controller 120. The video input interface 302 is coupled to the graphics controller 110 via the video transmission line 112, and receives the input video data $S_1$. As an interface between the video input interface 302 and the graphics controller 110, a differential high-speed serial interface such as a Low Voltage Differential Signaling (LVDS) interface or the like may be employed. The input video data $S_1$ received by the video input interface 302 is stored as frame data $S_4$ in the memory 304. The memory 304 is configured as Static Random Access Memory (SRAM). However, the present disclosure is not restricted to such an arrangement.

The main logic 306 executes necessary signal processing on the frame data $S_4$. After the output video data $S_2$ is processed by the main logic 306, the video output interface 308 outputs the output video data $S_2$ to the timing controller 120.

The control input interface 310, the OSD processing unit 320, and a multiplexer 330 are provided in relation to the OSD function.

Immediately after a power supply is turned on, the bridge circuit 300 is set to the setup state. For example, in the start-up operation, as a preliminary stage before the bridge circuit 300 displays a video signal on the display panel 102, a setting period (initializing period) is provided for setting parameters or the like required for the operation of the bridge circuit 300. A part of the initializing period may be defined as the "setup state".

Also, the bridge circuit 300 may be configured such that the setup state can be set by a command supplied from an external circuit. For example, the bridge circuit 300 may include a register as a built-in component for supporting the setup state. The bridge circuit 300 may be configured such that, upon writing "1" to the register from an external circuit (e.g., the processor 114), the bridge circuit 300 is switched to the setup state. This arrangement allows the bridge circuit 300 to be switched to the setup state at a desired timing in addition to immediately after the start-up of the bridge circuit 300.

In the setup state, the control input interface 310 receives graphics data $S_5$ for the On Screen Display (OSD) from the processor 114. The graphics data $S_5$ is stored in nonvolatile memory 118, and is transmitted from the processor 114 to the control input interrace 310. The graphics data $S_5$ may be configured as monochrome bitmap data or color bitmap data. However, the present disclosure is not restricted to such an arrangement. Also, the graphics data $S_5$ may represent a desired target, examples of which include icons, figures, characters, etc. As the control input interface 310, a register access interface may be employed. For example, a Serial Peripheral Interface (SPI) or an Inter-Integrated Circuit (I²C) interface may preferably be employed. However, the present disclosure is not restricted to such an arrangement. FIG. 2 shows a configuration in which the processor 114 is provided as a separate component that differs from the graphics controller 110. Also, the function of the processor 114 may be integrated in the graphics controller 110.

The OSD processing unit 320 includes an encoder 322 and a decoder 324. In the setup state, the encoder 322 encodes the graphics data $S_5$, and stores compressed image data $S_6$ thus encoded in the memory 304. Furthermore, address information $S_7$ that indicates an address at which the compressed image data $S_6$ is stored is held such that it is associated with the graphics data $S_5$.

In the setup state, multiple items of graphics data $S_5$ may be input. In this case, an ID may preferably be assigned to each item of graphics data $S_5$. Furthermore, each ID may preferably be stored in the memory 304 such that it is associated with the compressed image data $S_6$ and the address information $S_7$.

In the normal state, the control input interface 310 receives an instruction signal $S_8$ including the ID that designates the graphics data to be displayed. The decoder 324 refers to the address information $S_7$ that corresponds to the ID, and reads one item of compressed image data $S_6$ that corresponds to the ID information from the memory 304. Furthermore, the decoder 324 decodes the compressed image data $S_6$ thus read, so as to reproduce the original graphics data $S_9$.

The multiplexer 330 superimposes the graphics data $S_9$ on frame data $S_{10}$ output from the main logic 306, and outputs the superimposed data to the video output interface 308.

Such an arrangement is preferably capable of controlling the display position at which the graphics data $S_9$ is displayed. The instruction signal $S_8$ may include position information POS that indicates the position at which the graphics data $S_9$ is to be displayed. The multiplexer 330 displays the graphics data $S_9$ at a position that corresponds to the position information POS.

The above is the configuration of the bridge circuit 300. Next, description will be made regarding the compressing of the graphics data $S_5$. The graphics data $S_5$ may be compressed using the run-length compression method.

Figure 3:
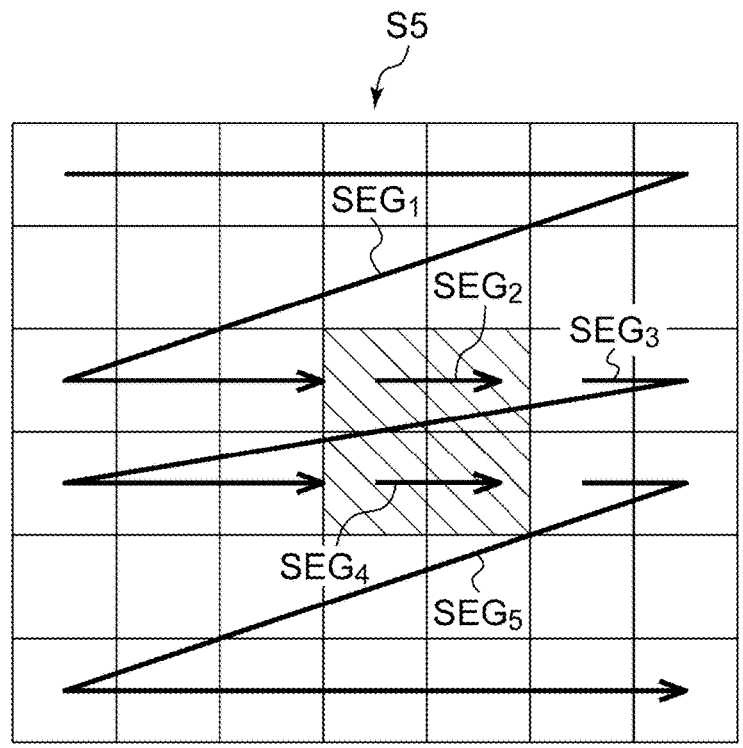
FIG. 3 is a diagram for explaining run-length compression of compressed image data.

FIG. 3 is a diagram for explaining the run-length compression of the graphics data $S_5$. For simplification of description, FIG. 3 shows an example in which the graphics data $S_5$ is configured as (7×6)-pixel graphics data. In actuality, the graphics data $S_5$ may be configured as (50×50)-pixel graphics data or (100×100)-pixel graphics data. Also, the graphics data $S_5$ may be configured as graphics data including a different number of pixels. Also, the graphics data $S_5$ may be configured such that there is a difference in the number of pixels between the vertical direction and the horizontal direction.

With the run-length compression method, consecutive pixels having the same color (which will be referred to as a "same-color segment") are converted into a combination of the color data CD and the run-length value RL that indicates the number of the consecutive pixels. The run-length compression is sequentially executed from the top line to the bottom line. Furthermore, the run-length compression is sequentially executed for each line in order from the leftmost pixel to the rightmost pixel. In FIG. 3, each arrow indicates a same-color segment SEG.

The color data CD may be represented by 24 bits of data composed of 8 bits each for R, G, and B.

The graphics data $S_5$ shown in FIG. 3 is divided into five same-color segments $SEG_1$ through $SEG_5$. The same-color segments $SEG_1$ through $SEG_5$ are represented by the run-length values RL, i.e., 17, 2, 5, 2, and 16, respectively. Furthermore, the same-color segments $SEG_1$, $SEG_3$, and SEG$_5$ each have a first color. The same-color segments SEG$_2$ and SEG$_4$ each have a second color. Accordingly, the compressed image data S$_6$ that corresponds to a single item of graphics data S$_5$ can be represented by one or multiple items of the segment data SEG.

Figure 4:
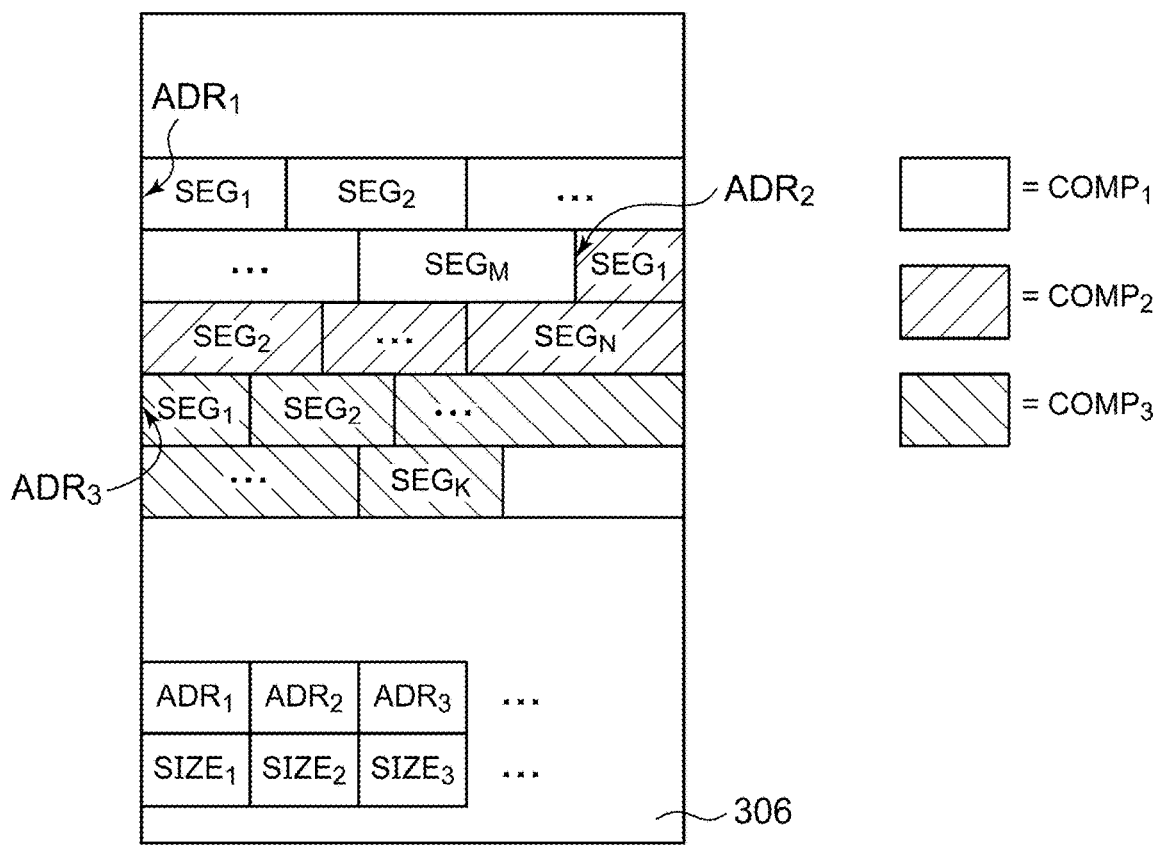
FIG. 4 is a diagram showing compressed image data stored in nonvolatile memory or memory.

FIG. 4 is a diagram showing the compressed image data COMP(S$_6$) stored in the memory 304. The first compressed image data COMP$_1$ includes M items of segment data that represent M same-color segments. The second compressed image data COMP$_2$ includes N items of segment data. The third compressed image data COMP$_3$ includes K items of segment data. The initial address of each compressed image data COMP is stored as address information ADR in the memory 304.

The graphics data S$_5$ may be designed to have a fixed size (fixed number of pixels). For example, the graphics data S$_5$ may be configured as (50×50)-pixel graphics data. Also, in order to provide improved flexibility, such an arrangement may be configured to allow the user to select the size of the graphics data S$_5$ from among multiple options. For example, the bridge circuit 300 may be configured to support two kinds of graphics data having different sizes, i.e., (50×50)-pixel graphics data and (100×100)-pixel graphics data. In this case, in the setup state, the size data SIZE that indicates the size of the graphics data S$_5$ may preferably be input in addition to the graphics data S$_5$ itself. The size data SIZE is recorded in the memory 304 such that it is associated with the ID of the graphics data S$_5$.

In order to provide further improved flexibility, the bridge circuit 300 may be configured to allow the user to freely specify the size of the graphics data S$_5$. For example, in the setup state, the size data SIZE that indicates the number of vertical pixels and the number of horizontal pixels may preferably be input in addition to the graphics data S$_5$. The size data is recorded in the memory 304 such that it is associated with the ID of the graphics data S$_5$.

Figure 5A:
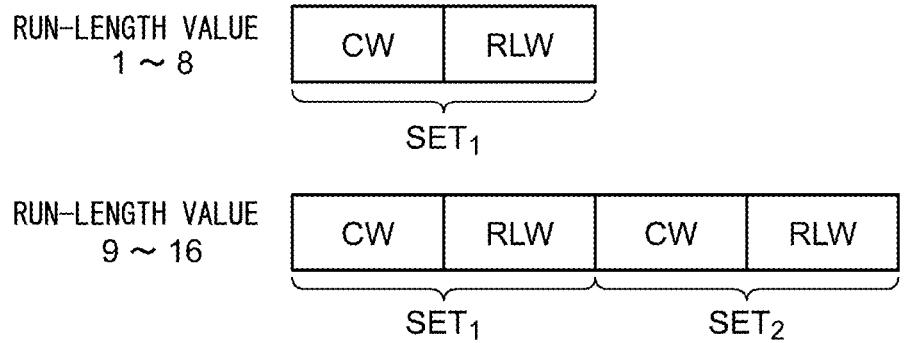
FIG. 5A through FIG. 5C are diagrams each showing a data structure of a same-color segment.
Figure 5B:
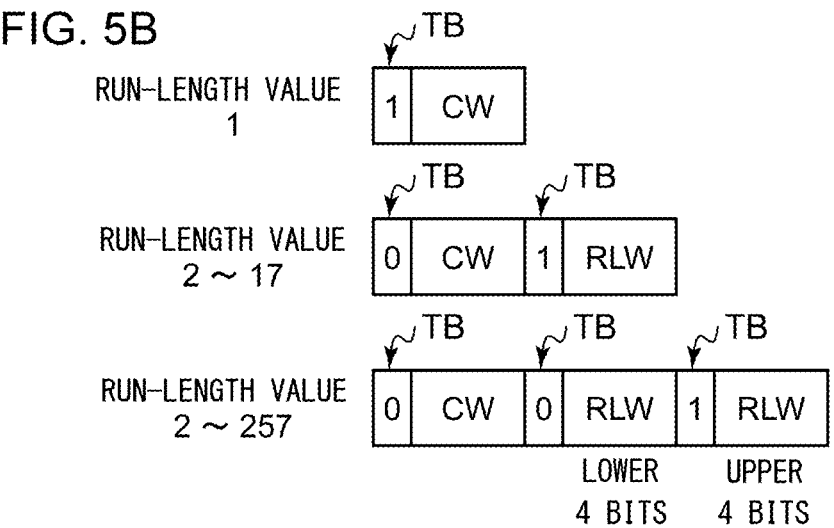
Figure 5C:
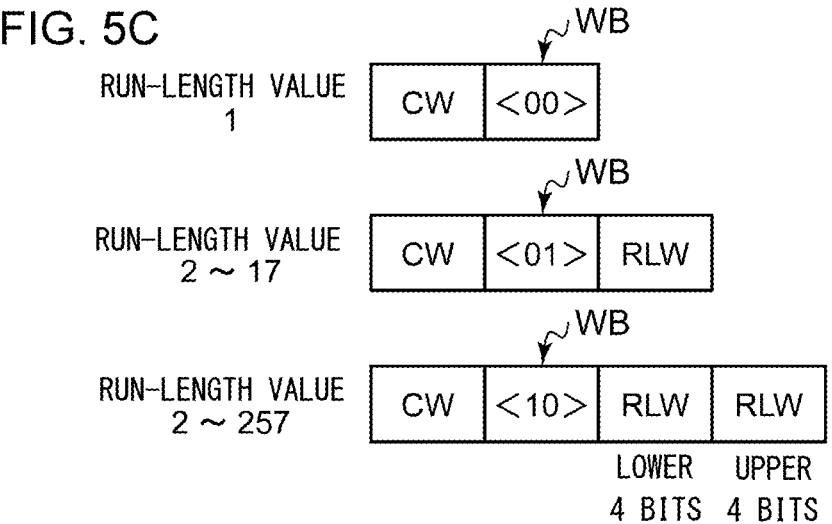

FIG. 5A through FIG. 5C are diagrams each showing a data structure of the same-color segment SEG. FIG. 5A shows a first data structure. The data of one same-color segment SEG (segment data) includes one or multiple combinations of a color word CW and a run-length word RLW.

In a case in which each run-length word RLW is configured as 3 bits of data, and in a case in which the number of consecutive pixels of "0" is not represented by the run-length word RLW, this arrangement allows a run-length word RLW ranging from <000> to <111> to represent a run-length value ranging from 1 to 8.

As with a case of the same-color segment SEG$_2$ (SEG$_3$, SEG$_4$), in a case in which the same-number segment is represented by a run-length value RL of 8 or less, as shown in FIG. 5A, the compressed image data of the same-color segment is represented by a single set SET$_1$ including a single color word CW and a single run-length word RLW.

In a case in which a given same-color segment SEG is represented by a run-length value RL of 9 or more, one same-color segment SEG is represented by multiple sets having the same color data CD value. For example, in a case in which the same-color segment SEG$_1$ is represented by the run-length value RL of 17, the number of the same-color consecutive pixels is divided into 16 and 1. That is to say, the same-color segment SEG$_1$ is represented by two of the sets SET$_1$ and SET$_2$. Here, the two sets SET$_1$ and SET$_2$ have the same color word CW. The run-length word RLW of the first set is set to <111>, and the run-length word RLW of the second set is set to <011>.

In a case in which the run-length value RL is 17 to 24, the run-length value RL can be divided into (8+8+a) run-length values (1≤a≤8). In this case, the same-color segment SEG can be represented by three of the sets SET.

It should be noted that, for ease of understanding, description has been made regarding an arrangement in which each word is configured as 3 bits of data. However, the present disclosure is not restricted to such an arrangement. Also, each word may be designed to have a data amount on the order of 4 to 6 bits. The optimum number of bits to be assigned to each word may preferably be determined so as to provide an improved data compression rate giving consideration to the shape or size of the graphics data.

FIG. 5B shows a second data structure. The second data structure supports a run-length value RL having a variable format length.

A separator bit that indicates a boundary between the same-color segments SEG is included at the beginning of the color word CW and the run-length word RLW. FIG. 5B shows an example in which the separator bit is configured as a terminal bit TB that indicates a terminal same-color segment. Specifically, when the separator bit is set to a value of "1", it indicates the terminal same-color segment. Instead of indicating the terminal same-color segment, the separator bit may be designed to indicate a starting same-color segment.

In a case in which the same-color segment is represented by a run-length value RL of 1, the second data structure may be designed to include only the color word CW with the terminal bit TB of 1, and to include no run-length word RLW. This arrangement provides a further improved data compression rate. With this arrangement, the run-length value ranging between 2 and 17 can be represented by four-bit run-length words RLW ranging from <0000> to <1111>.

For example, in a case in which given graphics data represents a character, in order to support smooth font display, in some cases, such an arrangement supports anti-aliasing. In many cases, this arrangement provides the contour portion of the character with a same-color segment having a run-length value RL of 1. By representing the run-length value RL=1 by the second data structure without a run-length word RLW, this arrangement provides an improved data compression rate particularly for such character data.

When the terminal bit TB=1 is appended to the second run-length word RLW, the run-length value is represented by two words configured as 8 bits of data. For example, the first run-length word RLW may be assigned to the lower 4 bits, and the second run-length word RLW may be assigned to the upper 4 bits, or vice versa. An 8-bit run-length value RL ranging from <00000000> to <11111111> obtained by coupling the two run-length words RLW represents values of 2 to 257.

It should be noted that, in a case in which a preceding run-length word RLW is assigned to the run-length value in order from the lower bits of the run-length value, in the decoding operation, this arrangement is capable of marking (i.e., rasterizing) the pixel group that corresponds to the run-length value RL represented by the preceding run-length word RLW before reading the subsequent run-length word RLW.

When the terminal bit TB=1 is appended to the third run-length word RLW, the run-length value RL is represented by three words configured as 12 bits of data.

With the first data structure shown in FIG. 5A, each set SET includes a color word CW having the same value. In some cases, such a redundant data structure leads to a poor data compression rate. In contrast, with the second data structure, this arrangement involves no redundancy with respect to the color word CW, thereby providing an improved data compression rate.

FIG. 5C shows a third data structure. As with the second data structure, the third data structure supports a run-length value RL with a variable format length. With the third data structure, the segment data includes no terminal bit TB for each word. Instead, a bit (word-number indication bit) WB that indicates the number of words that represent the run-length value RL is inserted. The number of bits assigned to the word-number indication bit is not restricted in particular. Description will be made regarding an example in which the word-number indication bit is configured as 2 bits of data. When the run-length value RL is a value ranging between 2 and 17, the word-number indication bit WB is set to 1 (represented by a binary value <01>). In this case, the segment data includes a single run-length word RLW. When the run-length value RL is a value ranging between 2 and 257, the word-number indication bit WB is set to 2 (represented by a binary value <10>). In this case, the segment data includes two run-length words RLW. The first run-length word RLW may represent the lower 4 bits of the run-length value RL, and the second run-length word RLW may represent the upper 4 bits of the run-length value RL.

With the second data structure shown in FIG. 5B, as the number of words that represent the run-length value becomes larger, the total number of the terminal bits TB becomes larger, leading to a reduced data compression rate. In contrast, with the third data structure, the number of bits of the word-number bit WB is maintained at a constant value even if the number of words that represent the run-length value is increased, thereby suppressing a reduction in the data compression rate. It should be noted that each of the second data structure and the third data structure may preferably be designed so as to provide an improved data compression rate giving consideration to the shape and size of the graphics data.

Various other kinds of data structures are conceivable as follows. For example, in the second or third data structures, the sum total of the values of multiple run-length words RLW may be defined as the run-length value RL in the same manner as with the first data structure. For example, the segment data may be designed such that, when the segment data includes two run-length words RLW of binary values <0001> and <1111>, the run-length value RL may be (3+17=20).

The above is the configuration of the bridge circuit 300. Next, description will be made regarding the operation thereof.

1. Setup State

After a device or a system including the bridge circuit 300 is started up, the bridge circuit 300 is set to the setup state. The processor 114 transmits the graphics data $S_5$ to the control input interface 310 together with the size data SIZE. The encoder 322 compresses the received graphics data $S_5$, and stores the compressed image data $S_6$ in the memory 304. In a case in which multiple items of graphics data $S_5$ are supported, the multiple items of graphics data are sequentially compressed.

2. Normal State

The graphics controller 110 transmits the video data $S_1$ to the video input interface 302 via the video transmission line 112. The bridge circuit 300 processes the video data $S_1$, and supplies the processed video data $S_1$ to the timing controller 120. The timing controller 120 controls the gate driver 104 and the source driver 106 so as to display an image on the display panel 102.

When graphics are to be displayed on the display panel using the OSD function, the processor 114 transmits the instruction signal $S_8$ via a line that differs from the video data $S_1$ line. The instruction signal $S_8$ includes ID information that designates one from among the multiple items of graphics data $S_5$ transmitted to the bridge circuit 300 in the setup state, and the position information POS that indicates the display position.

The decoder 324 refers to the address information $S_7$ that corresponds to the ID information, and accesses the compressed image data $S_6$ that corresponds to the address information $S_7$. Furthermore, the decoder 324 decodes the compressed image data $S_6$ based on the size data SIZE so as to expand it to the graphics data $S_9$ in a bitmap format. The multiplexer 330 displays the graphics data $S_9$ at a position designated by the position information POS. FIG. 7 is a diagram showing the display panel 102 displaying two items of graphics data $S_{91}$ and $S_{92}$.

The multiplexer 330 may be configured to extract a region in which the graphics data $S_9$ is to be arranged from the frame data $S_{10}$, and to replace the brightness values of the extracted region with the brightness values of the graphics data $S_9$.

The above is the operation of the bridge circuit 300. Next, description will be made regarding the advantages thereof.

The encoder and the decoder for the OSD graphics data are built into the bridge circuit 300. The graphics data $S_5$ is supplied every time the bridge circuit 300 is set up. This allows various kinds of graphics data to be displayed.

Furthermore, the graphics data is stored in the memory 304 in a compressed format. This allows the memory 304 to have a reduced memory capacity, thereby providing a reduced cost. FIG. 6 is a diagram for explaining the data compression rate with respect to the same-color segment in a case in which the second data structure shown in FIG. 5B is employed. Description will be made below assuming that the run-length word RLW has a bit width of 4 bits. The data compression rate is increased according to an increase in the run-length value RL. In a case in which the run-length value is 1 or 2, the segment data has a data amount that is larger than the original pixel data. However, in many cases, such a run-length value of 1 or 2 is used only for anti-aliasing or the like for characters, icons, and figures. That is to say, such a run-length value of 1 or 2 is used with very low probability. Accordingly, such an arrangement provides a sufficiently high data compression rate for the overall graphics data.

With the example shown in FIG. 1, the ROM 111 that stores the graphics data for the OSD is required to be provided to the timing controller 200R side. However, with the image display system 100 shown in FIG. 2, the graphics data does not need to be stored in such ROM. The memory 304 configured as SRAM or the like has an advantage of a lower cost as compared with ROM, thereby allowing the total cost to be reduced.

With the system shown in FIG. 1, the ROM 111 is configured as One-Time Programmable (OTP) ROM. Accordingly, in a case in which the graphics data for the OSD is to be changed or added, the ROM 111 needs to be replaced. In many cases, it is not possible to replace the ROM. Even in a case in which it is possible to replace the ROM, such ROM replacement requires enormous costs.

In many systems, instead of such one-time ROM, the processor 114 is coupled to writable nonvolatile memory 118 such as a hard disk, Solid State Drive (SSD), Electrically Erasable Programmable Read-Only Memory (EEPROM), flash memory, or the like. Accordingly, with the image display system 100 shown in FIG. 2, by changing or adding the graphics data stored in the nonvolatile memory 118, this arrangement allows the graphics data for the OSD to be changed or added.

Figure 8A:
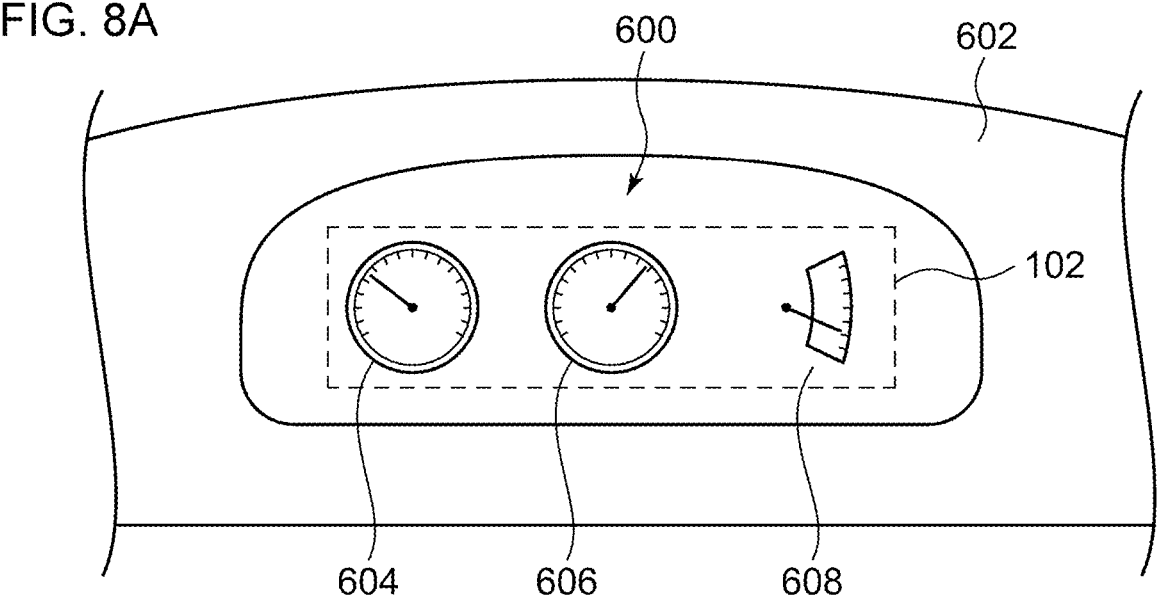
FIG. 8A through FIG. 8C are diagrams each showing an in-vehicle display apparatus employing a timing controller.

Next, description will be made regarding the usage of the bridge circuit 300. FIG. 8A is a diagram showing an in-vehicle display apparatus 600 using the bridge circuit 300. The in-vehicle display apparatus 600 is embedded in a console 602 arranged in the front of a cockpit. The in-vehicle display apparatus 600 receives video data $S_1$ indicating speedometer data 604, tachometer data 606 including the rotational speed of an engine, remaining fuel data 608, and remaining battery charge data in a case in which the vehicle is configured as a hybrid vehicle or an electric vehicle, etc., and displays the items of data thus received (FIG. 8A).

Figure 8B:
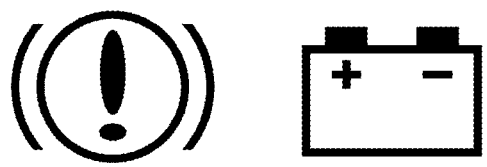

With conventional arrangements, as shown in FIG. 8B, indicator lamps or warning lamps that indicate some kind of abnormal state or that a battery has run out (which will be collectively referred to simply as the "warning lamps" hereafter) are provided as individual LEDs each configured as an external component of the display panel. The reason why such a warning lamp is not displayed on the display panel is as follows. That is to say, the timing controller 200R configured as a conventional system (system shown in FIG. 1) and the graphics controller 110 are coupled via a differential serial interface. During a period from the start-up operation of the system up to the link establishment supported by the serial interface between the timing controller 200R and the graphics controller 110, such an arrangement is not able to transmit image data. Accordingly, in this period, no image can be displayed on the display panel 102. Also, if link disconnection occurs due to noise effects or the like after the link has been established, such an arrangement is not able to display any image on the display panel 102 before the link is established again. Also, the same problem occurs when a cable is detached or disconnected, or when a malfunction occurs in a part of the serial interface or the graphics controller 110. Such a state in which an image cannot be displayed will be referred to as a "non-displayable state".

A warning lamp notifies the driver of important information. Accordingly, such a warning lamp is required to operate even in the non-displayable state. Giving consideration to such a situation, such a warning lamp is required to be provided as an external component of the display panel.

In contrast, the bridge circuit 300 according to the present embodiment is provided to the conventional image display system 100R as an additional component. Such an arrangement allows such a warning lamp to be displayed on the display panel as the graphics data $S_5$ for the OSD. This is because such an OSD display function does not require the communication supported by the differential serial interface. This arrangement requires no LED and no driving circuit thereof, thereby providing reduced costs. Furthermore, such an arrangement requires only an ECU standard function such as $I^2C$ or the like, thereby providing further reduced costs.

Figure 8C:
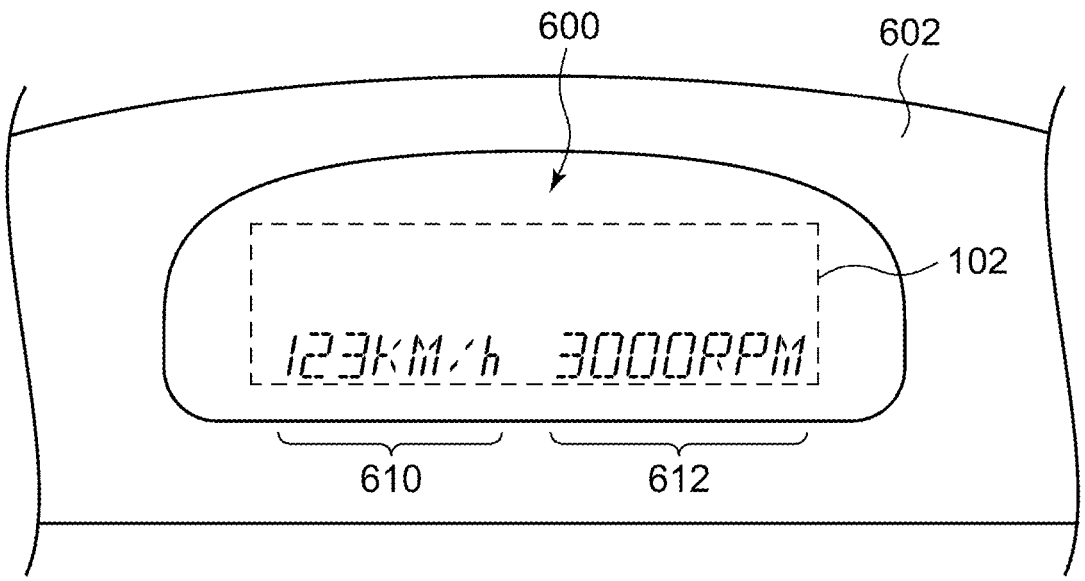

Also, when a situation (non-displayable state) in which the video data $S_1$ cannot be displayed occurs in the in-vehicle display apparatus 600, the display panel 102 blacks out, leading to difficulty in driving the vehicle. In order to solve such a problem, alphabetic and numeric characters may be prepared in the form of OSD graphics data $S_5$. When the speedometer 604 or tachometer 606 cannot be displayed due to the occurrence of some kind of abnormal state during driving of the vehicle, this arrangement is capable of displaying the vehicle speed information 610 and the engine rotational speed information 612 in a real-time manner using the OSD function as shown in FIG. 8C, thereby providing improved safety.

Also, when the user turns on the ignition of the vehicle, in the start-up operation of the in-vehicle display apparatus 600, such an arrangement allows a given character string such as "PLEASE WAIT . . . ", a character string that represents the current time, or the like, to be displayed using the OSD function before the video data $S_1$ can be displayed.

Also, the bridge circuit 300 may be employed in a medical display apparatus. The medical display apparatus displays necessary information for medical doctors and nurses in a medical examination, medical treatment, or surgery. The bridge circuit 300 allows such a medical display apparatus to display important information (e.g., the heart rate, blood pressure, and the like, of a patient) using the OSD function even in a situation in which the video data $S_1$ cannot be displayed.

Figure 9:
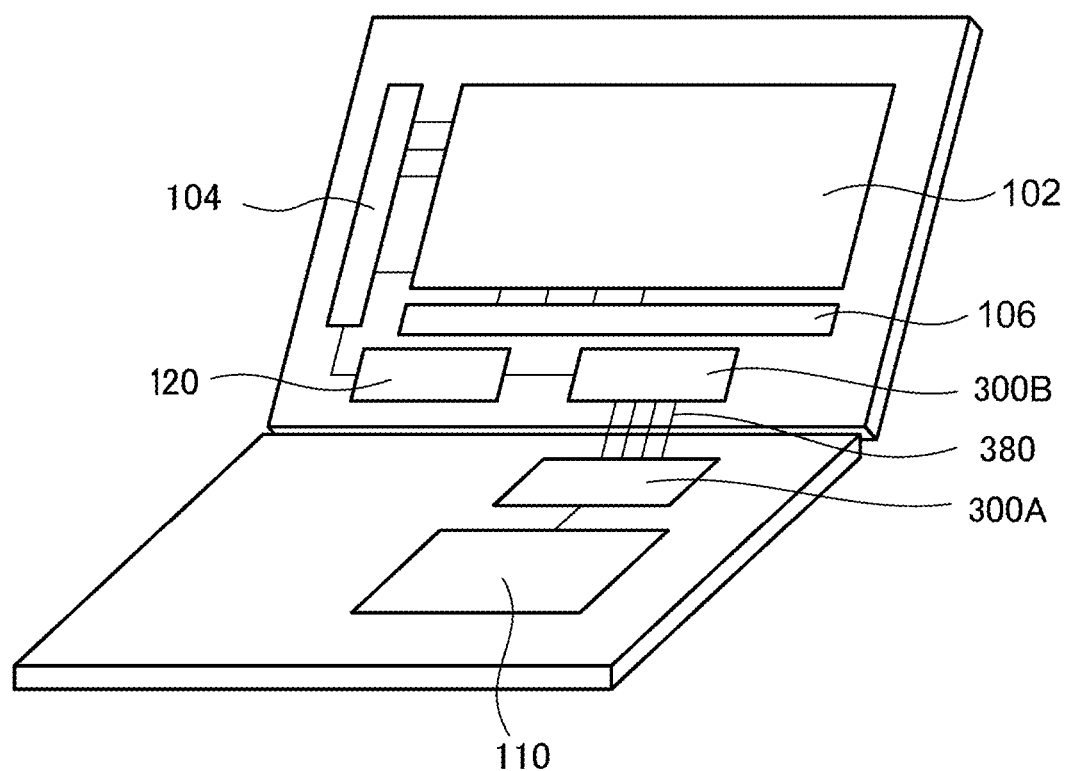
FIG. 9 is a perspective diagram showing an electronic device.

FIG. 9 is a perspective view showing an electronic device 500. The electronic device 500 shown in FIG. 9 may be configured as a laptop computer, a tablet terminal, a smartphone, a portable game machine, an audio player, or the like. The electronic device 500 includes a graphics controller 110, a display panel 102, a gate driver 104, and a source driver 106, each of which is built into a housing 502. A bridge circuit 300A, a propagation path 380, and a bridge circuit 300B are provided between the timing controller 120 and the graphics controller 110. Either one from among the two bridge circuits 300A and 300B may be provided with the OSD function. However, the processor 114 is mounted on the same housing on which the bridge circuit 300A is mounted. Accordingly, in a case in which the OSD function is implemented in the bridge circuit 300A, this allows the control line 116 to have a reduced length, which is desirable.

Description will be made regarding a modification relating to the first embodiment.

First Modification

Description has been made in the embodiment regarding an arrangement in which the OSD graphics data $S_9$ is displayed with the frame data $S_{10}$ as a background. The present disclosure is not restricted to such an arrangement. Also, the OSD graphics data may be displayed in a transparent manner or a semitransparent manner using alpha blending. In this case, the color data CD may be employed as an alpha value that represents the transparency level. This arrangement allows the graphics data $S_9$ to be superimposed and displayed on the frame data $S_{10}$ such that its background is displayed in a transparent manner or a semitransparent manner.

Second Modification

The encoder 322 may further compress the 24-bit color data CD using a color palette. For example, in a case in which the number of colors to be used to generate the compressed image data $S_5$ is 16 or less, a 4-bit color pallet is generated. When a segment having a new color is generated, the encoder 322 adds the new color to the palette, and holds an identifier defined as the color data CD in the color palette. In contrast, when a same-color segment having the same color as that defined in the color palette is generated, the encoder 322 holds the identifier assigned to the corresponding color as the color data CD. This allows the segment data to be further compressed.

Third Modification

The format of the control input interface 310 is not restricted to such a register access interface. For example, as with the first line 112, the control input interface 310 may be designed to support differential serial transmission. That is to say, the control input interface 310 may be designed with a desired interface.

Fourth Modification

Description has been made in the embodiment regarding an arrangement in which both the graphics data $S_5$ to be handled in the setup state and the instruction signal $S_8$ to be handled in the normal state are received via the control input interface 310 configured as a shared interface. Also, the graphics data $S_5$ and the instruction signal $S_8$ may be received via separate interfaces.

Fifth Modification

Description has been made in the embodiment regarding an arrangement employing the run-length compression method, which can be implemented easily. Also, other kinds of image compression methods may be employed. Also, an error detection method such as a Cyclic Redundancy Check (CRC) method may be applied to the graphics data $S_5$ or the instruction signal $S_8$. Also, instead of employing the CRC method, other kinds of error detection methods such as a parity method, checksum method, etc., may be applied.

Second Embodiment

Figure 10:
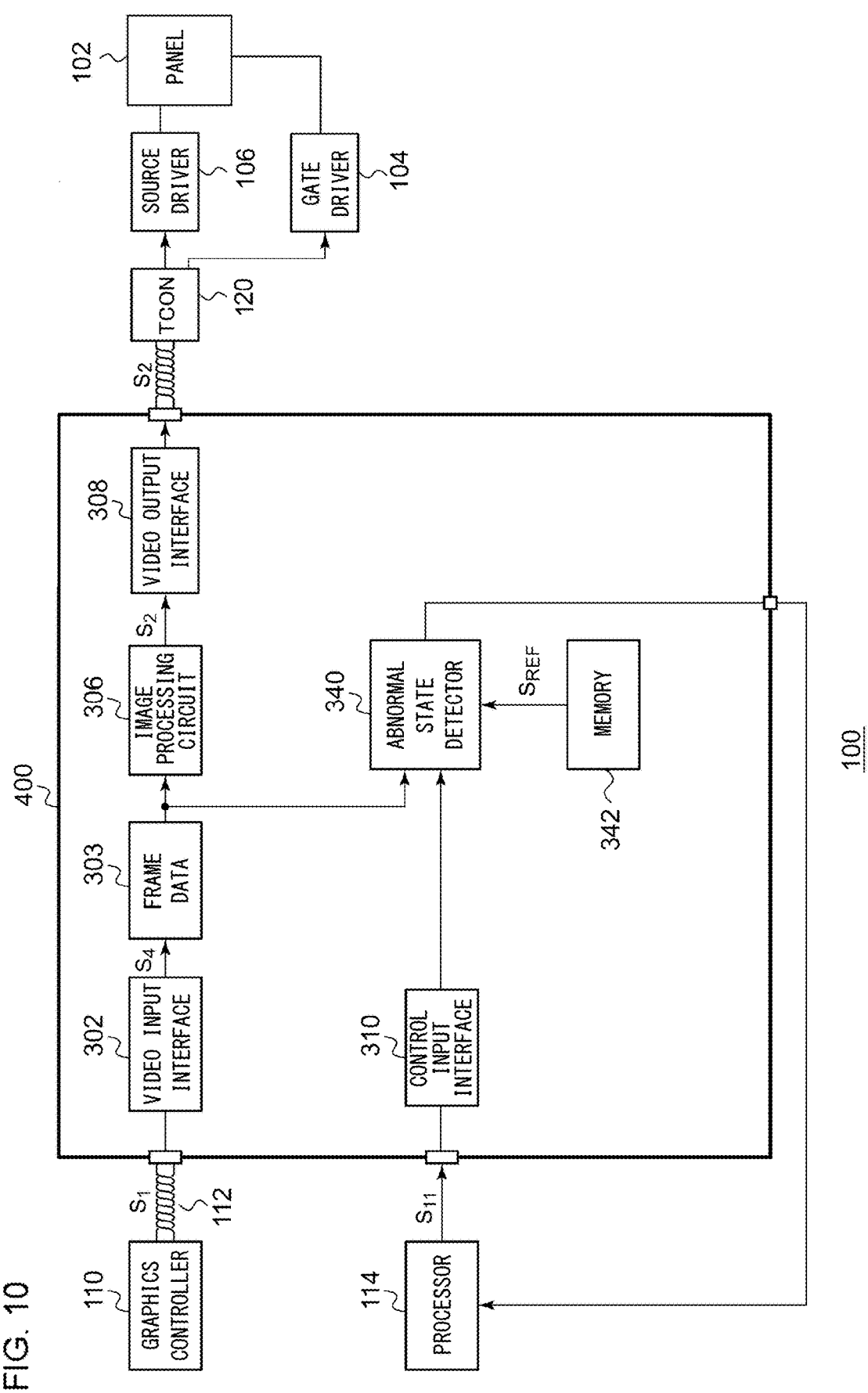
FIG. 10 is a block diagram showing an image display system including a timing controller according to a second embodiment.

FIG. 10 is a block diagram showing an image display system 100 including a bridge circuit 400 according to a second embodiment. The bridge circuit 400 has the same function as that described above. That is to say, the bridge circuit 400 has a function of relaying video data from a given device to a different device.

The bridge circuit 400 includes a video input interface 302, frame memory 303, an image processing circuit 306, a video output interface 308, a control input interface 310, an abnormal state detector 340, and memory 342.

The video input interface 302, the frame memory 303, the image processing circuit 306, and the video output interface 308 function as a circuit block for supporting the transmission of the video data from the graphics controller 110. The video input interface 302 is coupled to the graphics controller 110 via the video transmission line 112, and receives the video data $S_1$. As an interface between the video input interface 302 and the graphics controller 110, a differential high-speed serial interface such as a Low Voltage Differential Signaling (LVDS) interface or the like may be employed. The video data $S_1$ received by the video input interface 302 is stored as the frame data $S_4$ in the frame memory 303. The frame memory 303 may be configured as Static Random Access Memory (SRAM). However, the present disclosure is not restricted to such an arrangement. It should be noted that the frame memory 303 may be configured as a frame buffer that holds one frame of image data. Also, the frame memory 303 may be configured as a line buffer that holds one or multiple lines of data. The frame data $S_4$ can also be referred to as "line data".

The image processing circuit 306 applies various kinds of signal processing to the frame data $S_4$. The signal processing supported by the image processing circuit 306 is not restricted in particular. That is to say, the signal processing may be supported using a known technique. Examples of such signal processing include gamma (γ) correction, Frame Rate Control (FRC) processing, RGB mapping, etc. The video output interface 308 outputs the output video data $S_2$ thus processed by the image processing circuit 306 to the timing controller 120 (or another bridge circuit).

The abnormal state detector 340 and the memory 342 are provided for supporting a function of detecting an abnormal state, and particularly, a non-displayable state.

The memory 342 holds reference graphics data $S_{REF}$ that describes predetermined graphics that can be included in the video data $S_1$. The memory 342 may be configured as Read Only Memory (ROM) or writable nonvolatile memory such as flash memory. Also, the memory 342 may be configured as volatile memory as described relating to an embodiment described with reference to FIG. 13.

When such predetermined graphics are to be included in a frame displayed based on the video data $S_1$, the abnormal state detector 340 judges the presence or absence of an abnormal state (i.e., non-displayable state) based on comparison between the video data $S_4$ and the reference graphics data $S_{REF}$. Specifically, the abnormal state detector 340 judges whether or not the video data $S_4$ correctly includes the predetermined graphics represented by the reference graphics data $S_{REF}$. When judgement has been made that the video data $S_4$ correctly includes the predetermined graphics, the abnormal state detector 340 judges that the operation is normal. Conversely, when judgement has been made that the video data $S_4$ does not correctly include the predetermined graphics, the abnormal state detector 340 judges that the operation is abnormal.

The processor 114 is configured as a Central Processing Unit (CPU) or a microcontroller that integrally controls the image display system 100. FIG. 10 shows an arrangement in which the processor 114 is provided as a component that differs from the graphics controller 110. Also, the function of the processor 114 may be integrated in the graphics controller 110.

The control input interface 310 is provided as a component that differs from the video input interface 302. The bridge circuit 400 is configured to be capable of communicating with the processor 114. This allows the bridge circuit 400 to receive various kinds of control signals $S_{11}$ from the processor 114. As the control input interface 310, a register access interface may be employed. For example, a Serial Peripheral Interface (SPI) or an Inter-Integrated Circuit (I²C) interface may preferably be employed. However, the present disclosure is not restricted to such an arrangement.

When the abnormal state detector 340 detects an abnormal state, the bridge circuit 400 may issue an interrupt to the processor 114. This allows the processor 114 to be notified of the occurrence of an abnormal state (non-displayable state). The interrupt method is not restricted in particular. For example, an Interrupt Request (IRQ) method may be employed.

The above is the configuration of the bridge circuit 400. Next, description will be made regarding the operation of the bridge circuit 400.

Figure 11:
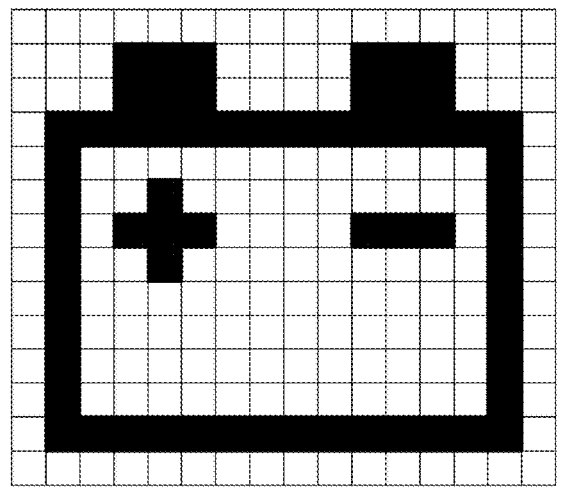
FIG. 11 is a diagram showing an example of predetermined graphics.

FIG. 11 is a diagram showing an example of the predetermined graphics. FIG. 11 shows an icon that represents a battery as an example of the predetermined graphics. However, the present disclosure is not restricted to such an example. The memory 342 stores the reference graphics data $S_{REF}$ that represents such predetermined graphics.

Figure 12A:
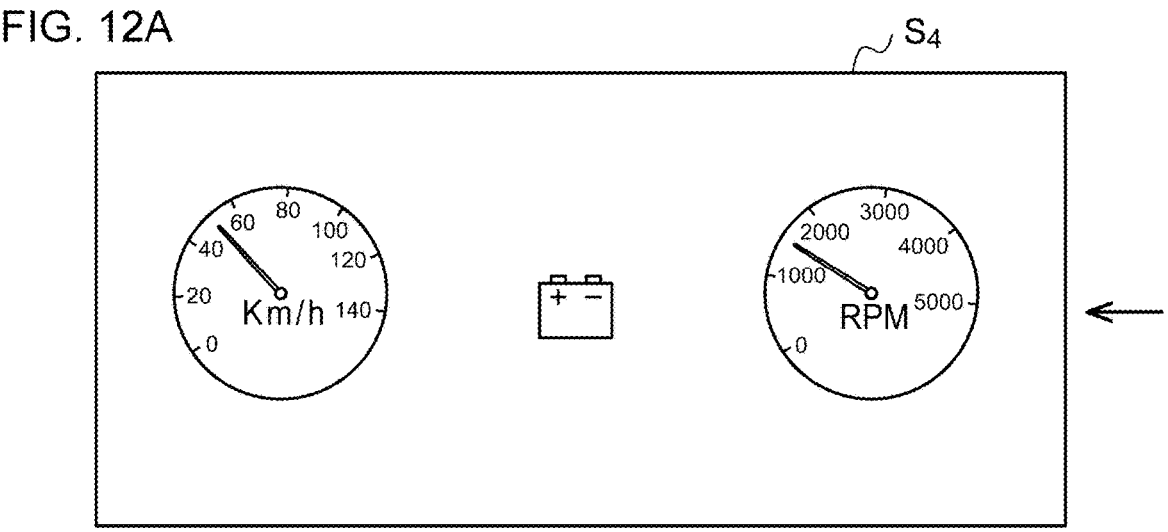
FIG. 12A and FIG. 12B are diagrams for explaining abnormal state detection supported by the timing controller.
Figure 12B:
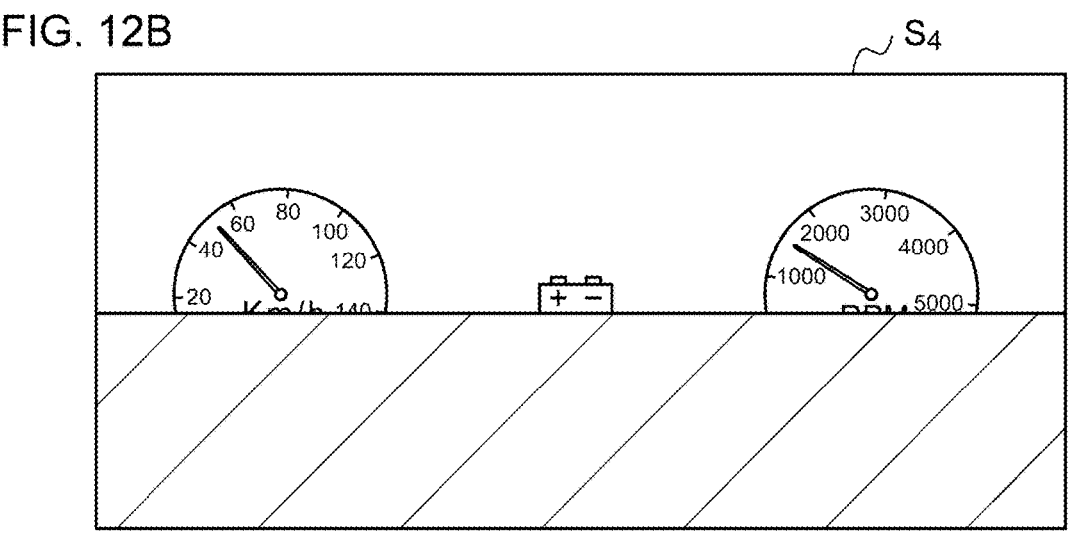

FIG. 12A and FIG. 12B are diagrams for explaining the abnormal state detection supported by the bridge circuit 400. FIG. 12A and FIG. 12B each show the frame data $S_4$ displayed based on the video data $S_1$ received by the video input interface 302. For ease of understanding, description will be made assuming that the predetermined graphics are included at predetermined positions in all the frames.

FIG. 12A shows frame data $S_{4a}$ when the video input interface 302 has received the video data $S_1$ normally. The frame data $S_{4a}$ can include various kinds of graphics such as a speedometer, tachometer, etc. The frame data $S_{4a}$ shown in FIG. 12A correctly includes the predetermined graphics shown in FIG. 11 at the predetermined positions. Accordingly, the abnormal state detector 340 judges that the operation is normal.

FIG. 12B shows frame data $S_{4b}$ when the video input interface 302 cannot correctly receive the video data $S_1$. In this example, the information with respect to the lower-half part of the frame data $S_{4b}$ has been lost due to a communication error. Accordingly, the frame data $S_{4b}$ does not correctly include the lower-half part of the predetermined graphics shown in FIG. 11. Accordingly, the abnormal state detector 340 judges that the operation is abnormal.

As described above, with the bridge circuit 400 shown in FIG. 10, judgment can be made regarding whether or not the video data $S_1$ is correctly transmitted from the graphics controller 110. This allows the occurrence of an abnormal state to be detected.

Description will be further made below regarding the functions and features of the bridge circuit 400.

Preferably, the control signal $S_{11}$ to be received by the control input interface 310 from the processor 114 may include information $S_{11A}$ with respect to whether or not the current frame is a target frame to be judged by the abnormal state detector 340. With this, in a case in which predetermined graphics are included in all the frames, for example, this arrangement is capable of controlling the frequency (e.g., once every 60 frames, once every second, or the like) at which the abnormal state judgement is to be made.

In a case in which such information $S_{11A}$ is used, such an arrangement is capable of employing graphics (characters) as the predetermined graphics that are to be displayed only when a predetermined condition is fulfilled. Examples of such graphics include various kinds of alarm lamps displayed on a cluster panel.

Such predetermined graphics may be displayed at variable positions. In this case, the control signal $S_{11}$ received by the control input interface 310 from the processor 114 may include position information $S_{11B}$ that indicates the display position at which the predetermined graphics are to be displayed. With this, the abnormal state detector 340 may preferably judge whether or not the predetermined graphics are correctly displayed at the position indicated by the position information $S_{11B}$ with respect to the frame data $S_4$.

The predetermined graphics may be fixedly arranged at a predetermined position at an edge portion on the display panel such that it cannot be seen by the user. This allows all the frames to be employed as a judgment target to be judged by the abnormal state detector 340.

The number of items of the predetermined graphics data is not restricted to one. Also, multiple items of predetermined graphics data may be prepared. In this case, reference graphics data $S_{REF}$ may preferably be prepared for each item of predetermined graphics data.

The present disclosure encompasses various kinds of apparatuses and circuits that can be regarded as a block configuration or a circuit configuration shown in FIG. 10, or otherwise that can be derived from the aforementioned description. That is to say, the present disclosure is not restricted to a specific configuration. More specific description will be made below regarding example configurations and modifications for clarification and ease of understanding of the essence of the present disclosure and the circuit operation. That is to say, the following description will by no means be intended to restrict the technical scope of the present disclosure.

Figure 13:
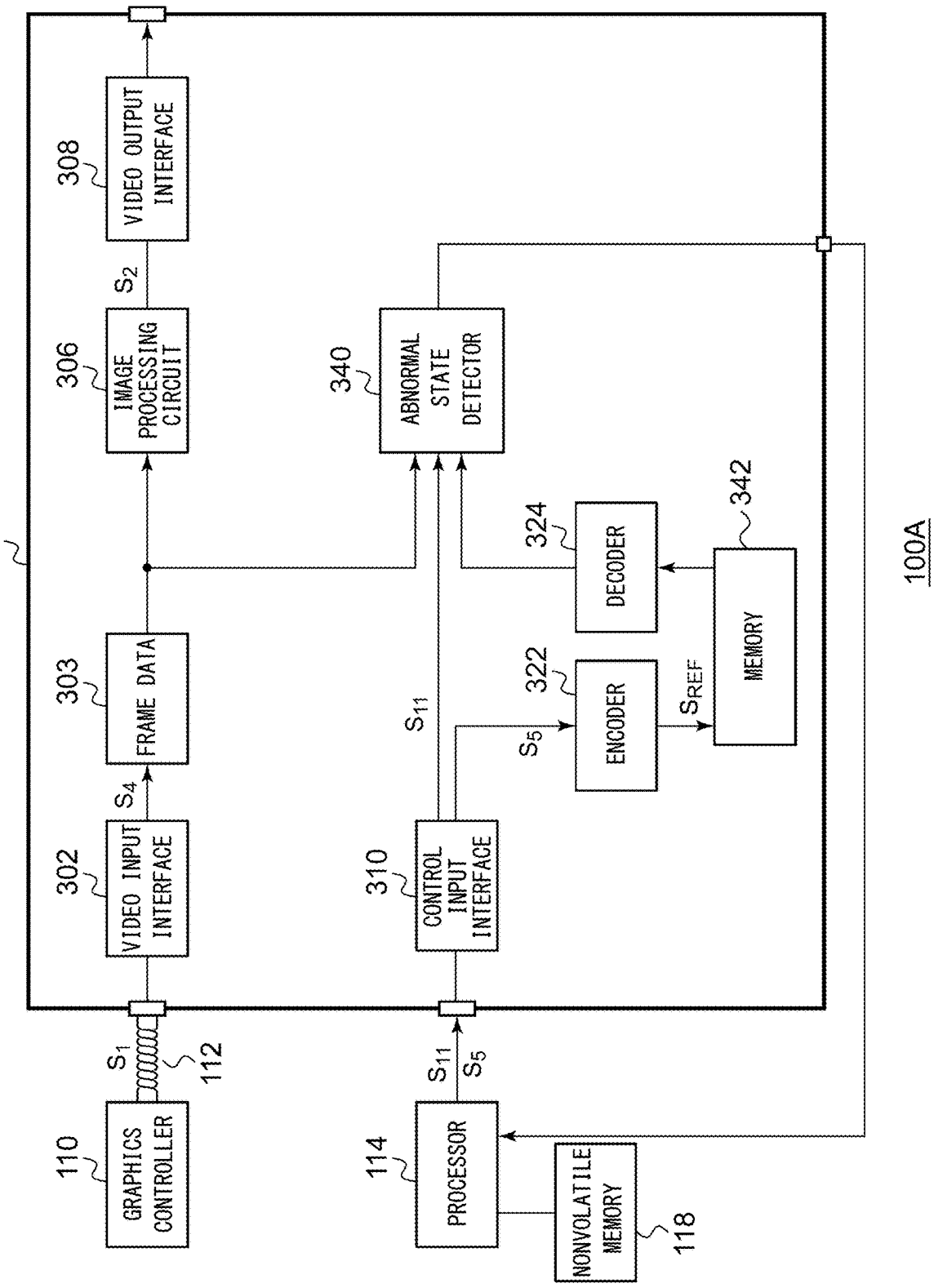
FIG. 13 is a block diagram showing an image display system including a timing controller according to an embodiment.

FIG. 13 is a block diagram showing an image display system 100A including a bridge circuit 400A according to an embodiment.

Immediately after a power supply is turned on, the bridge circuit 400A is set to the setup state. For example, in the start-up operation, as a previous stage before the bridge circuit 400A receives the video input data and outputs the video input data thus received to a panel, a setting period (initializing period) is provided for setting parameters or the like to be used in gamma correction or RGB mapping. A part of the initializing period may be defined as the "setup state".

Also, the bridge circuit 400 may be configured such that it is set to the setup state upon receiving a command supplied from an external circuit. For example, the bridge circuit 400A may include a register as a built-in component for supporting the setup state. The bridge circuit 400A may be configured such that, upon writing "1" to the register from an external circuit (e.g., the processor 114), the bridge circuit 400A is switched to the setup state. This arrangement allows the bridge circuit 400A to be switched to the setup state at a desired timing in addition to immediately after the bridge circuit 400A is started up.

With this example, the memory 342 may be configured as Static Random Access Memory (SRAM). The control input interface 310 is configured such that, in the setup state, it is able to receive graphics data $S_5$ that indicates predetermined graphics from the processor 114. The graphics data $S_5$ is stored in the nonvolatile memory 118, and is transmitted from the processor 114 to the control input interface 310. The graphics data $S_5$ may be configured as monochrome bitmap data or color bitmap data. However, the present disclosure is not restricted to such an arrangement. Also, the graphics data $S_5$ may represent a desired target, examples of which include icons, figures, characters, etc. Multiple items of graphics data $S_5$ may be supported.

The bridge circuit 400A further includes the encoder 322 and the decoder 324. The encoder 322 encodes the graphics data $S_5$ received by the control input interface 310 in the setup state so as to generate the reference graphics data $S_{REF}$, and stores the reference graphics data $S_{REF}$ thus generated in the memory 342. In the normal state, the decoder 324 decodes the reference graphics data $S_{REF}$ read from the memory 342 so as to reproduce the original graphics data.

The above is the configuration of the bridge circuit 400A. Next, description will be made regarding the compression of the graphics data $S_5$. The graphics data $S_5$ may be compressed using the run-length compression method. The run-length compression may be supported in the same manner as described with reference to FIG. 3 through FIG. 5A-FIG. 5C.

The above is the configuration of the bridge circuit 400A. Next, description will be made regarding the operation thereof.

1. Setup State

After a device or a system including the bridge circuit 400A is started up, the bridge circuit 400A is set to the setup state. The processor 114 transmits the graphics data $S_5$ to the control input interface 310 together with the size data SIZE. The encoder 322 compresses the received graphics data $S_5$, and stores the compressed image data $S_6$ as the reference graphics data $S_{REF}$ in the memory 342. In a case in which multiple items of graphics data $S_5$ are supported, the multiple items of graphics data are sequentially compressed.

2. Normal State

The graphics controller 110 transmits the video data $S_1$ to the video input interface 302 via the video transmission line 112. The bridge circuit 400 processes the video data $S_1$, and controls the gate driver 104 and the source driver 106 so as to display an image on the display panel. The abnormal state detector 340 judges whether or not the predetermined graphics reproduced by the decoder 324 are correctly included in the frame data $S_4$.

The above is the operation of the bridge circuit 400A. Next, description will be made regarding the advantages thereof.

The bridge circuit 400A includes, as its built-in components, the encoder and the decoder configured to support the graphics data to be used in the abnormal state judgement. Furthermore, the graphics data $S_5$ is supplied every time the bridge circuit 400A is set up. This allows the abnormal state judgment to be made using various kinds of graphics data.

Furthermore, the graphics data is stored in the memory 342 in a compressed format. This allows the memory 342 to have a reduced memory capacity, thereby providing a reduced cost. FIG. 6 is a diagram showing the data compression rate with respect to the same-color segment in a case in which the second data structure shown in FIG. 5B is employed. Description will be made below assuming that the run-length word RLW has a bit width of 4 bits. The data compression rate is increased according to an increase in the run-length value RL. In a case in which the run-length value is 1 or 2, the segment data has a data amount that is larger than the original pixel data. However, in many cases, such a run-length value of 1 or 2 is used only for anti-aliasing for characters, icons, and figures. That is to say, such a run-length value of 1 or 2 is used with very low probability. Accordingly, such an arrangement provides a sufficiently high data compression rate for the overall graphics data.

In a case in which the memory 342 that stores the reference graphics data $S_{REF}$ is configured as ROM, this leads to an increased cost. However, with the bridge circuit 400A shown in FIG. 13, the memory 342 may be configured as volatile memory such as SRAM or the like, thereby providing a reduced cost.

Instead of one-time ROM, in a case in which the non-volatile memory 118 coupled to the processor 114 is configured as writable nonvolatile memory 118 such as a hard disk, Solid State Drive (SSD), Electrically Erasable Programmable Read-Only Memory (EEPROM), flash memory, or the like, such an arrangement provides the following advantage. That is to say, in a case in which the memory 342 is configured as one-time memory that stores the reference graphics data $S_{REF}$, such an arrangement does not allow the predetermined graphics to be added or changed. In contrast, in a case in which the memory 342 is configured as volatile memory and the processor 114 is coupled to writable nonvolatile memory, such an arrangement allows the graphics data stored in the nonvolatile memory 118 to be changed or added. This allows the graphics data for the abnormal state detection to be easily changed or added.

Figure 14:
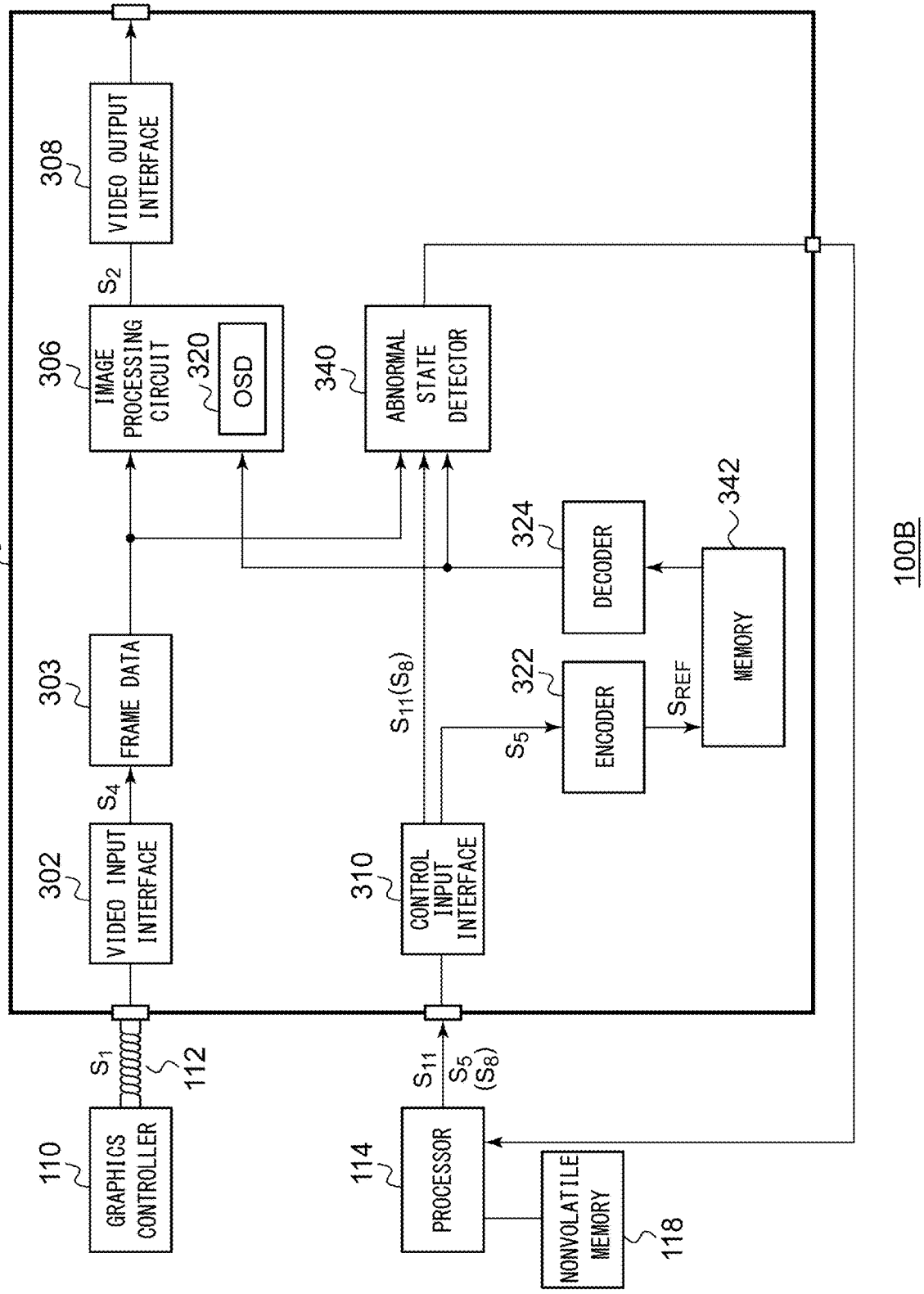
FIG. 14 is a block diagram showing an image display system including a timing controller according to an embodiment.

FIG. 14 is a block diagram showing the image display system 100A including a bridge circuit 400B according to an embodiment. The bridge circuit 400B is provided with an OSD function. The memory 342 stores the graphics data for the OSD. Preferably, the reference graphics data $S_{REF}$ to be used for the abnormal state detection is employed as shared graphics data that is also used as the OSD graphics data. This arrangement allows the memory 342 capacity to be saved.

The bridge circuit 400B is configured to be switchable between the OSD mode and the abnormal state detection mode. The bridge circuit 400B may be selectively switched between the OSD mode and the abnormal state detection mode according to the control signal $S_{11}$ received from the processor 114.

The operation may be selectively switchable between the OSD mode and the judgment mode in which judgment is made by the abnormal state detector. In the judgment mode, the abnormal state detector 340 is activated. Furthermore, the abnormal state judgment is made based on the graphics data reproduced by the decoder 324. The abnormal state judgment is made in the same manner as described above.

In the OSD mode, the abnormal state detector 340 is disabled, and the OSD processing unit 320 of the image processing circuit 306 is activated. The OSD processing unit 320 superimposes the graphics data reproduced by the decoder 324 on the frame data $S_4$ so as to generate the output video data $S_2$.

When the graphics are to be displayed on the display panel using the OSD function, the processor 114 sets the bridge circuit 400B to the OSD mode according to the control signal $S_{11}$.

Subsequently, the processor 114 transmits the instruction signal $S_8$ via a line that differs from the video data $S_1$ line. The instruction signal $S_8$ includes ID information that designates one from among multiple items of graphics data $S_5$ transmitted to the bridge circuit 400 in the setup state and position information POS that designates the display position.

Figure 15:
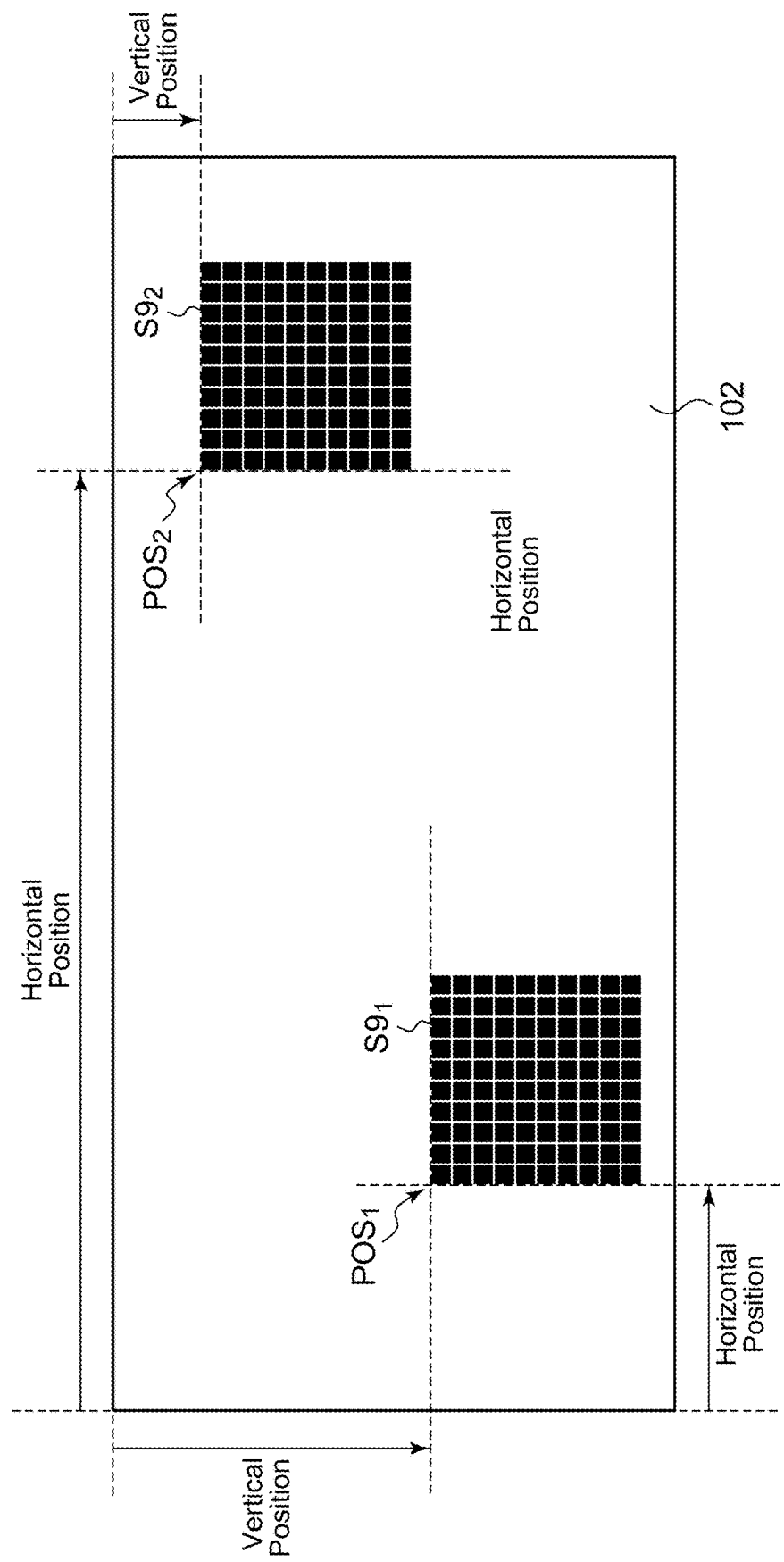
FIG. 15 is a diagram showing a display panel on which two items of graphics data are displayed.

The decoder 324 refers to the address information $S_7$ that corresponds to the ID information, and accesses the corresponding compressed image data $S_6$. Subsequently, the decoder 324 decodes the compressed image data $S_6$ based on the size data SIZE so as to expand it to the graphics data $S_9$ in a bitmap format. The OSD processing unit 320 displays the graphics data $S_9$ at a position designated by the position information POS. FIG. 15 is a diagram showing the display panel 102 displaying two items of graphics data $S_{91}$ and $S_{92}$.

The bridge circuit 400B is capable of supporting both the OSD function and the abnormal state detection function. Shared graphics data is employed for both the graphics data for the OSD and the graphics data for the abnormal state detection, thereby allowing the capacity of the memory 342 to be reduced.

With the bridge circuit 400B, a platform may be configured to support the OSD function. Also, another platform may be configured to support the abnormal state detection function.

Also, a platform may be configured to adaptively select one from among the OSD function and the abnormal state detection function, thereby providing an improved degree of freedom. For example, as a default mode, the abnormal state detection function may be enabled. Furthermore, when the abnormal state detector 340 has detected the occurrence of an abnormal state, the OSD function may be used. When an abnormal state has occurred in the transmission of the image data via the video transmission line 112, the bridge circuit 400B issues an interrupt to the processor 114. Upon receiving the interrupt, the processor 114 sets the bridge circuit 400B to the OSD mode. Subsequently, the processor 114 appropriately generates the instruction signal $S_8$ so as to display an image on the display.

More preferably, a shared signal may be employed for both the instruction signal $S_8$ for the OSD in the OSD mode and the control signal $S_{11}$ for the abnormal state detection in the abnormal state detection mode. In other words, a register may be employed such that it is shared by the OSD control and the abnormal state detection. For example, the address to which the position information POS for the OSD is to be written may be the same as the address to which the position information $S_{11B}$ for displaying the predetermined graphics in the abnormal state detection mode is to be written. This allows the register capacity to be reduced.

Next, description will be made regarding the usage of the bridge circuit 400 according to the second embodiment. The bridge circuit 400 may be employed in the in-vehicle display apparatus 600 shown in FIG. 8A. The in-vehicle display apparatus 600 is embedded in a console 602 arranged in the front of a cockpit. The in-vehicle display apparatus 600 receives, from a vehicle-side processor, video data $S_1$ including speedometer data 604, tachometer data 606 that indicates the rotational speed of an engine, remaining fuel data 608, and remaining battery charge data in a case in which the vehicle is configured as a hybrid vehicle or an electric vehicle, etc., and displays the items thus received (FIG. 8A).

With conventional arrangements, as shown in FIG. 8B, indicator lamps or warning lamps that indicate some kind of abnormal state or that a battery has run out (which will be collectively referred to simply as the "warning lamps" hereafter) are provided as individual LEDs each configured as an external component of the display panel. The reason why such a warning lamp is not displayed on the display panel is as follows. That is to say, the bridge circuit 400 and the graphics controller 110 are coupled via a differential serial interface. During a period from the start-up operation of the system up to the link establishment supported by the serial interface between the bridge circuit 400 and the graphics controller 110, such an arrangement is not able to transmit image data. Accordingly, in this period, no image can be displayed on the display panel 102. Also, if link disconnection occurs due to noise effects after the link has been established, such an arrangement is not able to display any image on the display panel 102 before the link is established again. Also, the same problem occurs when a cable is detached or disconnected, or when a malfunction occurs in a part of the serial interface or the graphics controller 110. Such a state in which an image cannot be displayed will be referred to as a "non-displayable state".

A warning lamp notifies the driver of important information. Accordingly, such a warning lamp is required to operate even in the non-displayable state. Giving consideration to such a situation, such a warning lamp is required to be provided as an external component of the display panel.

In contrast, with the bridge circuit 400 according to the embodiment, such an arrangement allows such a warning lamp to be displayed on the display panel as the graphics data $S_5$ for the OSD. This is because such an OSD display function does not require the communication supported by the differential serial interface. This arrangement requires no LED and no driving circuit thereof, thereby providing reduced costs. Furthermore, such an arrangement requires only an ECU standard function such as $I^2C$ or the like, thereby providing further reduced costs.

Also, when a situation (non-displayable state) in which the video data $S_1$ cannot be displayed occurs in the in-vehicle display apparatus 600, the display panel 102 blacks out, leading to difficulty in driving the vehicle. In order to solve such a problem, alphabetic and numeric characters may be prepared in the form of OSD graphics data $S_5$. When the speedometer 604 or tachometer 606 cannot be displayed due to the occurrence of some kind of abnormal state during driving of the vehicle, this arrangement is capable of displaying the vehicle speed information 610 and the engine rotational speed information 612 in a real-time manner using the OSD function as shown in FIG. 8C, thereby providing improved safety.

Also, when the user turns on the ignition of the vehicle, in the start-up operation of the in-vehicle display apparatus 600, such an arrangement allows a given character string such as "PLEASE WAIT . . . ", a character string that represents the current time, or the like, to be displayed using the OSD function before the video data $S_1$ can be displayed.

Also, the bridge circuit 400 may be employed in a medical display apparatus. The medical display apparatus displays necessary information for medical doctors and nurses in a medical examination, medical treatment, or surgery. The bridge circuit 400 allows such a medical display apparatus to display important information (e.g., the heart rate, blood pressure, and the like, of a patient) using the OSD function even in a situation in which the video data $S_1$ cannot be displayed.

Also, the bridge circuit 400 may be mounted on the electronic device 500 shown in FIG. 9.

Figure 16A:
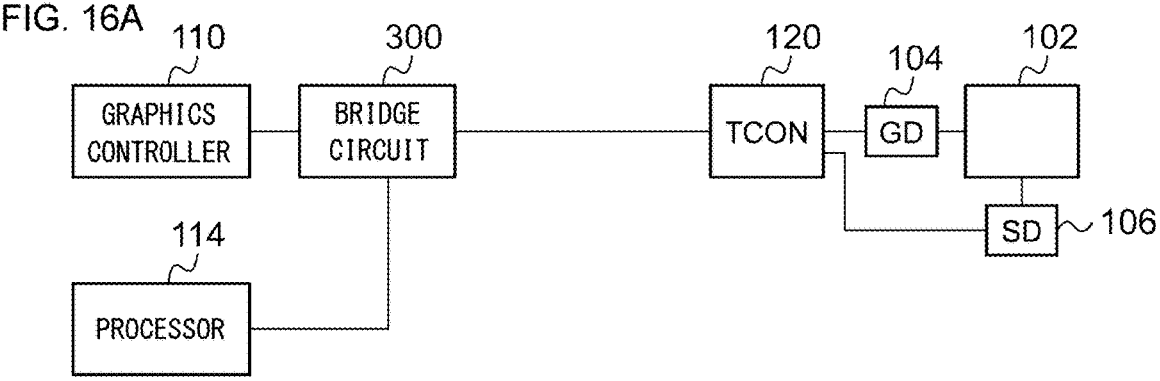
FIG. 16A through FIG. 16C are block diagrams each showing an application of the block diagram.
Figure 16B:
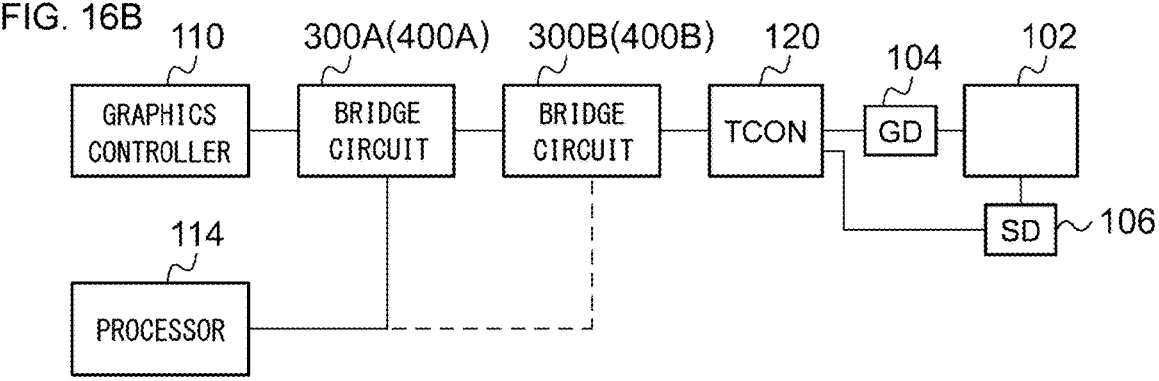
Figure 16C:
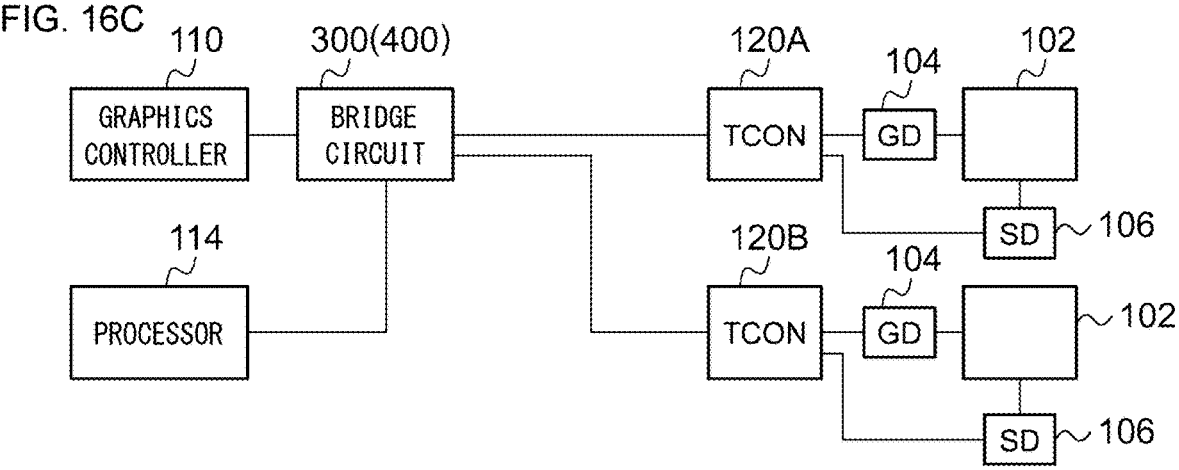

FIG. 16A through FIG. 16C are block diagrams each showing an application of the bridge circuit 300 (400). FIG. 16A shows an application in which the bridge circuit 300 (400) is provided between the graphics controller 110 and the timing controller 120.

FIG. 16B shows an application employed in the electronic device shown in FIG. 9. Two of the bridge circuits 300 (400) are provided in series between the graphics controller 110 and the timing controller 120. The OSD function and the abnormal state detection function may be implemented in the first-stage bridge circuit 300 or the second-stage bridge circuit 300.

FIG. 16C shows an application in which the bridge circuit 300 (400) has two output lines so as to transmit the video signal to two timing controllers via two different lines.

Description has been made regarding the present disclosure with reference to the embodiments using specific terms. However, the above-described embodiments show only the mechanisms and applications of the present disclosure for exemplary purposes only, and are by no means intended to be interpreted restrictively. Rather, various modifications and various changes in the layout can be made without departing from the spirit and scope of the present disclosure defined in appended claims.

The invention claimed is:
1. A bridge circuit comprising:
a video input interface structured to receive input video data in a normal state;
a control input interface structured to, in a setup state, receive a plurality of items of compressed graphics data for an On Screen Display (OSD);

an encoder structured to, in the setup state, encode the plurality of items of graphics data, and store the plurality of items of compressed image data thus encoded in memory;

a decoder structured to, in the normal state, read from the memory one item that corresponds to an instruction signal from among the plurality of items of compressed image data, and decode the compressed image data thus read, so as to reproduce original graphics data; and a multiplexer structured to superimpose the graphics data on the input video data, wherein the encoder compresses the graphics data using a run-length compression method, wherein the compressed image data includes at least one item of segment data, wherein each segment data represents a same-color segment comprising consecutive pixels having the same color, wherein the segment data comprises color data that represents color and a run-length value that represents a number of consecutive pixels, wherein the run-length value is configured to have a variable format length, and wherein the segment data comprises:
  a color word comprising a separator bit and the color data; and
  at least one run-length word each comprising a separator bit and a run-length value.

2. The bridge circuit according to claim 1, wherein the control input interface receives size data that indicates a pixel size of the graphics data,
  and wherein the control input interface stores the compressed image data in the memory together with the size data thus received.

3. The bridge circuit according to claim 1, wherein the instruction signal comprises position information that indicates a position at which the graphics data is to be displayed,
  and wherein the multiplexer displays the graphics data at a position that corresponds to the position information.

4. A display apparatus comprising the bridge circuit according to claim 1.

5. An electronic device comprising the bridge circuit according to claim 1.

6. A bridge circuit comprising:
  a video input interface structured to receive input video data in a normal state;
  a control input interface structured to, in a setup state, receive a plurality of items of compressed graphics data for an On Screen Display (OSD);
  an encoder structured to, in the setup state, encode the plurality of items of graphics data, and store the plurality of items of compressed image data thus encoded in memory;
  a decoder structured to, in the normal state, read from the memory one item that corresponds to an instruction signal from among the plurality of items of compressed image data, and decode the compressed image data thus read, so as to reproduce original graphics data; and
  a multiplexer structured to superimpose the graphics data on the input video data, wherein the encoder compresses the graphics data using a run-length compression method, wherein the compressed image data includes at least one item of segment data, wherein each segment data represents a same-color segment comprising consecutive pixels having the same color, wherein the segment data comprises color data that represents color and a run-length value that represents a number of consecutive pixels, wherein the run-length value is configured to have a variable format length, wherein the segment data comprises:
  a color word comprising the color data;
  a word-number indication bit that indicates a number of words that represent the run-length value; and
  run-length words, a number of which matches the number of words represented by the word-number indication bit.

7. The bridge circuit according to claim 6, wherein the control input interface receives size data that indicates a pixel size of the graphics data,
  and wherein the control input interface stores the compressed image data in the memory together with the size data thus received.

8. The bridge circuit according to claim 6, wherein the instruction signal comprises position information that indicates a position at which the graphics data is to be displayed,
  and wherein the multiplexer displays the graphics data at a position that corresponds to the position information.

9. A display apparatus comprising the bridge circuit according to claim 6.

10. An electronic device comprising the bridge circuit according to claim 6.

* * * * *